(12) United States Patent
Shih et al.

(10) Patent No.: US 10,325,467 B2
(45) Date of Patent: Jun. 18, 2019

(54) EVENT PRIORITIZATION AND USER INTERFACING FOR HAZARD DETECTION IN MULTI-ROOM SMART-HOME ENVIRONMENT

(71) Applicant: Google Inc., Mountain View, CA (US)

(72) Inventors: Nina F. Shih, Mountain View, CA (US); Lauren Von Dehsen, San Francisco, CA (US); David Sloo, San Francisco, CA (US); Tyler Moore, San Francisco, CA (US); Nicholas Unger Webb, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/626,352

(22) Filed: Jun. 19, 2017

(65) Prior Publication Data
US 2017/0287299 A1  Oct. 5, 2017

Related U.S. Application Data

(63) Continuation of application No. 14/717,769, filed on May 20, 2015, now Pat. No. 9,685,061.

(51) Int. Cl.
| | | |
|---|---|---|
| *G08B 21/02* | (2006.01) | |
| *G08B 3/10* | (2006.01) | |
| *G08B 17/107* | (2006.01) | |
| *G08B 25/10* | (2006.01) | |

(52) U.S. Cl.
CPC ............... *G08B 21/02* (2013.01); *G08B 3/10* (2013.01); *G08B 17/107* (2013.01); *G08B 25/10* (2013.01)

(58) Field of Classification Search
CPC ............ H05B 37/0272; H05B 37/0227; G08B 21/12; H04L 12/2803; H04L 12/2818
See application file for complete search history.

(56) References Cited

U.S. PATENT DOCUMENTS

| | | | | |
|---|---|---|---|---|
| 3,909,813 A | | 9/1975 | Scheidweiler et al. | |
| 4,417,235 A | * | 11/1983 | Del Grande | G08B 1/08 340/384.71 |
| 4,429,299 A | * | 1/1984 | Kabat | G08B 19/00 340/10.1 |

(Continued)

FOREIGN PATENT DOCUMENTS

| | | |
|---|---|---|
| AU | 2012203421 A1 | 7/2012 |
| CN | 1648959 A | 8/2005 |

(Continued)

*Primary Examiner* — Hai Phan
*Assistant Examiner* — Son M Tang
(74) *Attorney, Agent, or Firm* — Van Court & Aldridge LLP

(57) ABSTRACT

Systems and methods for providing spoken messages that reflect event status of one or more hazard detection systems within a smart-home environment are described herein. The messages can inform occupants in concise manner that does not overload cognitive recognition of those occupants. For example, the messages may be prioritized to limit the amount of information that is spoken and intelligently condense information in as concise a manner as possible. This may be accomplished by using one or more speaking paradigms to compile audible messages to be played back through a speaker of the hazard detection system.

18 Claims, 26 Drawing Sheets

(56) References Cited

U.S. PATENT DOCUMENTS

| | | | |
|---|---|---|---|
| 4,511,886 A | 4/1985 | Rodriguez | |
| 4,901,056 A * | 2/1990 | Bellavia | G08B 29/145 340/12.1 |
| 5,117,217 A | 5/1992 | Nykerk | |
| 5,165,465 A | 11/1992 | Kenet | |
| 5,173,683 A | 12/1992 | Brighenti et al. | |
| 5,289,275 A | 2/1994 | Ishii et al. | |
| 5,382,943 A | 1/1995 | Tanaka | |
| 5,594,410 A * | 1/1997 | Lucas | G08B 7/062 340/328 |
| 5,663,714 A | 9/1997 | Fray | |
| 5,705,979 A * | 1/1998 | Fierro | G08B 25/04 340/506 |
| 5,815,066 A * | 9/1998 | Pumilia | G08B 29/145 340/309.9 |
| 5,831,526 A * | 11/1998 | Hansler | G08B 17/00 340/531 |
| 6,144,310 A | 11/2000 | Morris | |
| 6,166,627 A | 12/2000 | Reeley | |
| 6,215,405 B1 | 4/2001 | Handley et al. | |
| 6,307,482 B1 * | 10/2001 | Le Bel | G08B 7/06 340/309 |
| 6,323,780 B1 | 11/2001 | Morris | |
| 6,518,878 B1 | 2/2003 | Skoff | |
| 6,642,849 B1 | 11/2003 | Kondziolka | |
| 6,762,688 B2 * | 7/2004 | Johnston | G08B 17/10 340/628 |
| 6,970,077 B2 | 11/2005 | Johnson et al. | |
| 7,148,810 B2 * | 12/2006 | Bhat | G08B 3/10 340/692 |
| 7,576,659 B2 | 8/2009 | Lax | |
| 7,649,472 B1 * | 1/2010 | Paterno | F21V 33/0076 307/116 |
| 7,952,476 B1 | 5/2011 | Causey et al. | |
| 8,466,800 B1 * | 6/2013 | Billman | G08B 29/145 340/500 |
| 8,489,065 B2 | 7/2013 | Green et al. | |
| 8,599,018 B2 * | 12/2013 | Kellen | G08B 5/36 340/541 |
| 9,767,674 B2 * | 9/2017 | Matsuoka | G08B 25/002 |
| 2001/0043144 A1 | 11/2001 | Morris | |
| 2002/0046299 A1 | 4/2002 | Lefeber et al. | |
| 2002/0130782 A1 * | 9/2002 | Johnston | G08B 17/10 340/628 |
| 2002/0170595 A1 | 11/2002 | Oliver | |
| 2003/0016164 A1 | 1/2003 | Finke et al. | |
| 2003/0023473 A1 | 1/2003 | Guyan et al. | |
| 2003/0234731 A1 | 12/2003 | Rhodes et al. | |
| 2006/0164253 A1 * | 7/2006 | Harvey | G08B 17/10 340/628 |
| 2007/0076095 A1 | 4/2007 | Tomaszewski | |
| 2007/0139183 A1 | 6/2007 | Kates | |
| 2007/0159323 A1 | 7/2007 | Rockefeller et al. | |
| 2007/0205888 A1 | 9/2007 | Lee et al. | |
| 2007/0239813 A1 | 10/2007 | Pinder et al. | |
| 2007/0241866 A1 | 10/2007 | Cool et al. | |
| 2008/0101789 A1 | 5/2008 | Sharma | |
| 2008/0129497 A1 | 6/2008 | Woodard et al. | |
| 2008/0291037 A1 | 11/2008 | Lax | |
| 2009/0070682 A1 | 3/2009 | Dawes et al. | |
| 2009/0173506 A1 | 7/2009 | Yoshida | |
| 2009/0201143 A1 | 8/2009 | McKenna et al. | |
| 2009/0273470 A1 | 11/2009 | Sinkevicius et al. | |
| 2010/0052903 A1 | 3/2010 | Tiwari et al. | |
| 2011/0102131 A1 | 5/2011 | de Clerq et al. | |
| 2011/0211563 A1 | 9/2011 | Herrala et al. | |
| 2011/0241877 A1 | 10/2011 | Wedig et al. | |
| 2013/0009775 A1 | 1/2013 | Egawa | |
| 2013/0073289 A1 | 3/2013 | Morris | |
| 2014/0179257 A1 | 6/2014 | Petite | |
| 2015/0022337 A1 * | 1/2015 | Gettings | G01N 21/84 340/501 |
| 2015/0077242 A1 | 3/2015 | Simoncic et al. | |
| 2015/0077248 A1 | 3/2015 | Eck | |
| 2015/0097683 A1 | 4/2015 | Sloo et al. | |
| 2015/0097687 A1 | 4/2015 | Sloo et al. | |
| 2015/0187194 A1 * | 7/2015 | Hypolite | G08B 7/06 340/628 |
| 2015/0348400 A1 * | 12/2015 | Zribi | G08B 29/185 340/506 |

FOREIGN PATENT DOCUMENTS

| | | |
|---|---|---|
| CN | 101341521 A | 1/2009 |
| CN | 102779388 A | 11/2012 |
| KR | 10-2004-0008545 | 1/2004 |

* cited by examiner

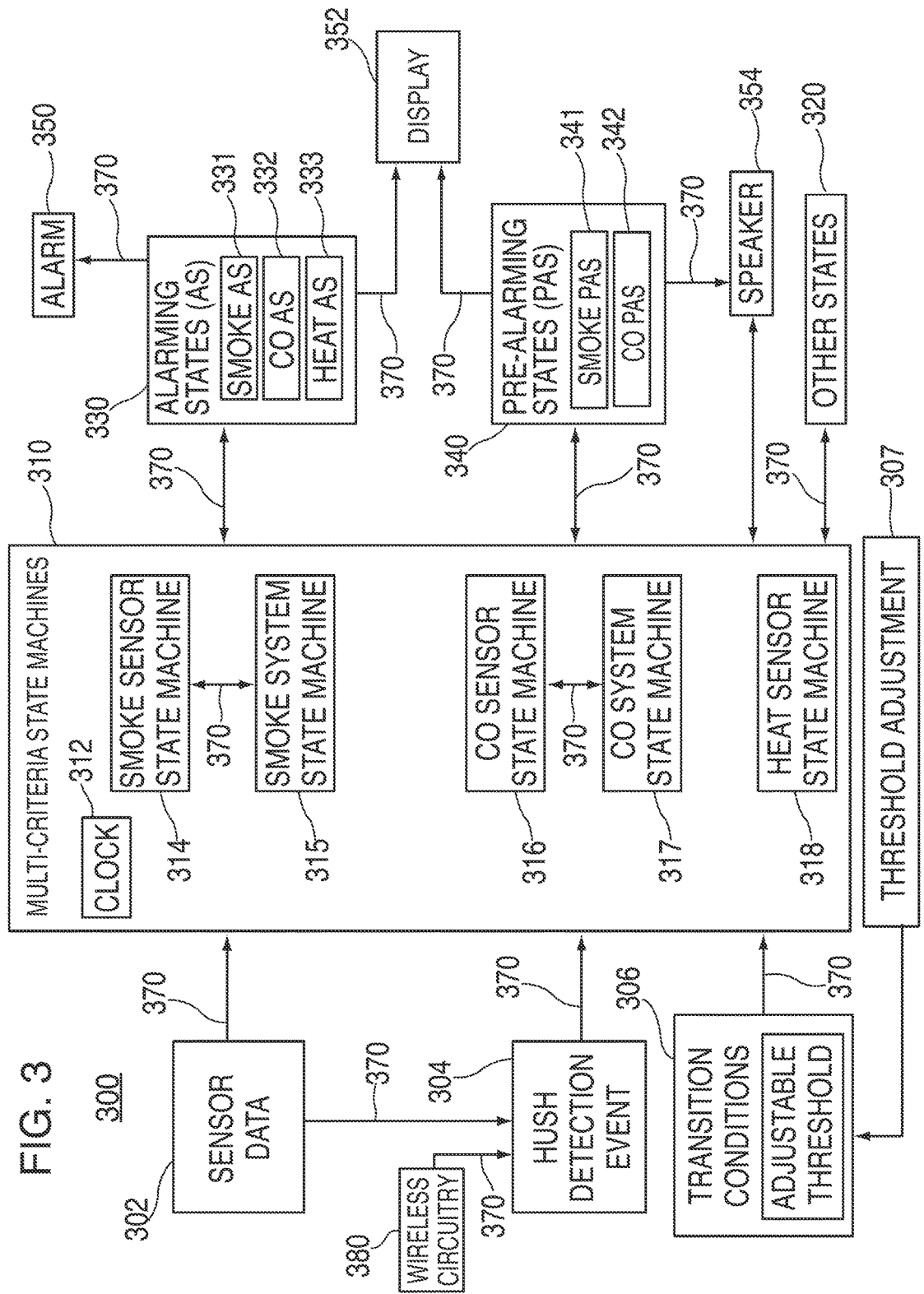

| Alarm Priority | 461 | 464 | 466 | 470 |
|---|---|---|---|---|
| 1. | SMOKE | ALARM | LOCAL | UNHUSHABLE |
| 2. | SMOKE | ALARM | REMOTE | UNHUSHABLE |
| 3. | SMOKE | ALARM | LOCAL | |
| 4. | SMOKE | ALARM | REMOTE | |
| 5. | CO | ALARM | LOCAL | |
| 6. | CO | ALARM | REMOTE | |
| 7. | SMOKE | ALARM | LOCAL | HUSHED |
| 8. | SMOKE | ALARM | REMOTE | HUSHED |
| 9. | CO | ALARM | LOCAL | HUSHED |
| 10. | CO | ALARM | REMOTE | HUSHED |
| 11. | SMOKE | HU2 | LOCAL | |
| 12. | SMOKE | HU2 | REMOTE | |
| 13. | CO | HU2 | LOCAL | |
| 14. | CO | HU2 | REMOTE | |
| 15. | CO | HU1 | LOCAL | |
| 16. | CO | HU1 | REMOTE | |
| 17. | SMOKE | HU1 OR 2 | LOCAL | HUSHED |
| 18. | SMOKE | HU1 OR 2 | REMOTE | HUSHED |
| 19. | CO | HU1 OR 2 | LOCAL | HUSHED |
| 20. | CO | HU1 OR 2 | REMOTE | HUSHED |
| 21. | SMOKE | HOLDING | LOCAL | |
| 22. | SMOKE | HOLDING | REMOTE | |
| 23. | CO | HOLDING | LOCAL | |
| 24. | CO | HOLDING | REMOTE | |
| 25. | SMOKE | MONITOR | LOCAL | |
| 26. | SMOKE | MONITOR | REMOTE | |
| 27. | CO | MONITOR | LOCAL | |
| 28. | CO | MONITOR | REMOTE | |
| 29. | SMOKE | IDLE | LOCAL | |
| 30. | SMOKE | IDLE | REMOTE | |
| 31. | CO | IDLE | LOCAL | |
| 32. | CO | IDLE | REMOTE | |

FIG. 4B

| RULES - ROOM SPEAKING LOGIC | 600 |
|---|---|

| CONDITION | SPEECH PARADIGM |
|---|---|
| n=1 AND LOCATION SPECIFIED | [ IN "x" ] |
| n=1 AND LOCATION NOT SPECIFIED | [ IN 1 ROOM ] |
| n=2 AND LOCATIONS SPECIFIED | [ IN "x" AND IN "y" ] |
| n=2 AND AT LEAST 2 LOCATIONS NOT SPECIFIED | [ IN 2 ROOMS ] |
| 2 < N < 10 | [ IN n ROOMS ] |
| n > 9 | [ IN MANY ROOMS ] | n = NUMBER OF HAZARD SYSTEMS EXPERIENCING A CONDITION
x = FIRST ROOM LOCATION
y = SECOND ROOM LOCATION

FIG. 6A

CONDITION SPEAKING LOGIC 660

| ALARM CONDITION | SPEECH PARADIGM |
|---|---|
| ONLY SMOKE | [ SMOKE ] |
| ONLY CARBON MONOXIDE | [ CARBON MONOXIDE ] |
| BOTH SMOKE AND CARBON MONOXIDE | [ SMOKE ] |

FIG. 6B

BEEP BEEP BEEP
(1.5 sec) Emergency.
BEEP BEEP BEEP
(1.5 sec) There's [smoke].
BEEP BEEP BEEP
(1.5 sec) [in the bedroom].
BEEP BEEP BEEP
(1.5 sec) Press to hush.

FIG. 10A

BEEP BEEP BEEP
(1.5 sec) Emergency.
BEEP BEEP BEEP
(1.5 sec) There's [smoke].
BEEP BEEP BEEP
(1.5 sec) [in 1 room].
BEEP BEEP BEEP
(1.5 sec) Press to hush.

FIG. 10B

BEEP BEEP BEEP
(1.5 sec) Emergency.
BEEP BEEP BEEP
(1.5 sec) There's [smoke].
BEEP BEEP BEEP
(1.5 sec) [in 9 rooms].
BEEP BEEP BEEP
(1.5 sec) Press to hush.

FIG. 10C

BEEP BEEP BEEP
(1.5 sec) Emergency.
BEEP BEEP BEEP
(1.5 sec) There's [smoke].
BEEP BEEP BEEP
(1.5 sec) [in 2 rooms].
BEEP BEEP BEEP
(1.5 sec) (if hushable) Press to hush.
BEEP BEEP BEEP
(1.5 sec) Emergency.
BEEP BEEP BEEP
(1.5 sec) There's [smoke].
BEEP BEEP BEEP
(1.5 sec) [in 2 rooms].
BEEP BEEP BEEP
(1.5 sec) (if hushable) Press to hush.
(10 sec) Emergency. There's smoke [in the kitchen and in the bedroom].
BEEP BEEP BEEP
(1.5 sec) Emergency.
BEEP BEEP BEEP
(1.5 sec) There's [smoke].
BEEP BEEP BEEP
(1.5 sec) [in 2 rooms].
BEEP BEEP BEEP
(1.5 sec) (if hushable) Press to hush.(otherwise just pause for 1.5 sec)
(10 sec) Emergency. There's smoke [in the kitchen and in the bedroom].
BEEP BEEP BEEP
(1.5 sec) Emergency.
BEEP BEEP BEEP
(1.5 sec) There's [smoke].
BEEP BEEP BEEP
(1.5 sec) [in 2 rooms].
BEEP BEEP BEEP

FIG. 10D

BIP BIP BIP BIP
(5 sec allowed) There's carbon monoxide [in many rooms]. Move to fresh air.
BIP BIP BIP BIP
(5 sec allowed) There's carbon monoxide. Press to hush.

FIG. 13A

BIP BIP BIP BIP
(5 sec allowed) There's carbon monoxide [in all rooms]. Move to fresh air.
BIP BIP BIP BIP
(5 sec allowed) There's carbon monoxide. Press to hush.

FIG. 13B

BIP BIP BIP BIP
(60 sec allowed) There's carbon monoxide [in the kitchen and in the bedroom]. Move to fresh air.
BIP BIP BIP BIP
(60 sec allowed) Emergency. There's carbon monoxdie. Press to hush (if hushable)

FIG. 13C

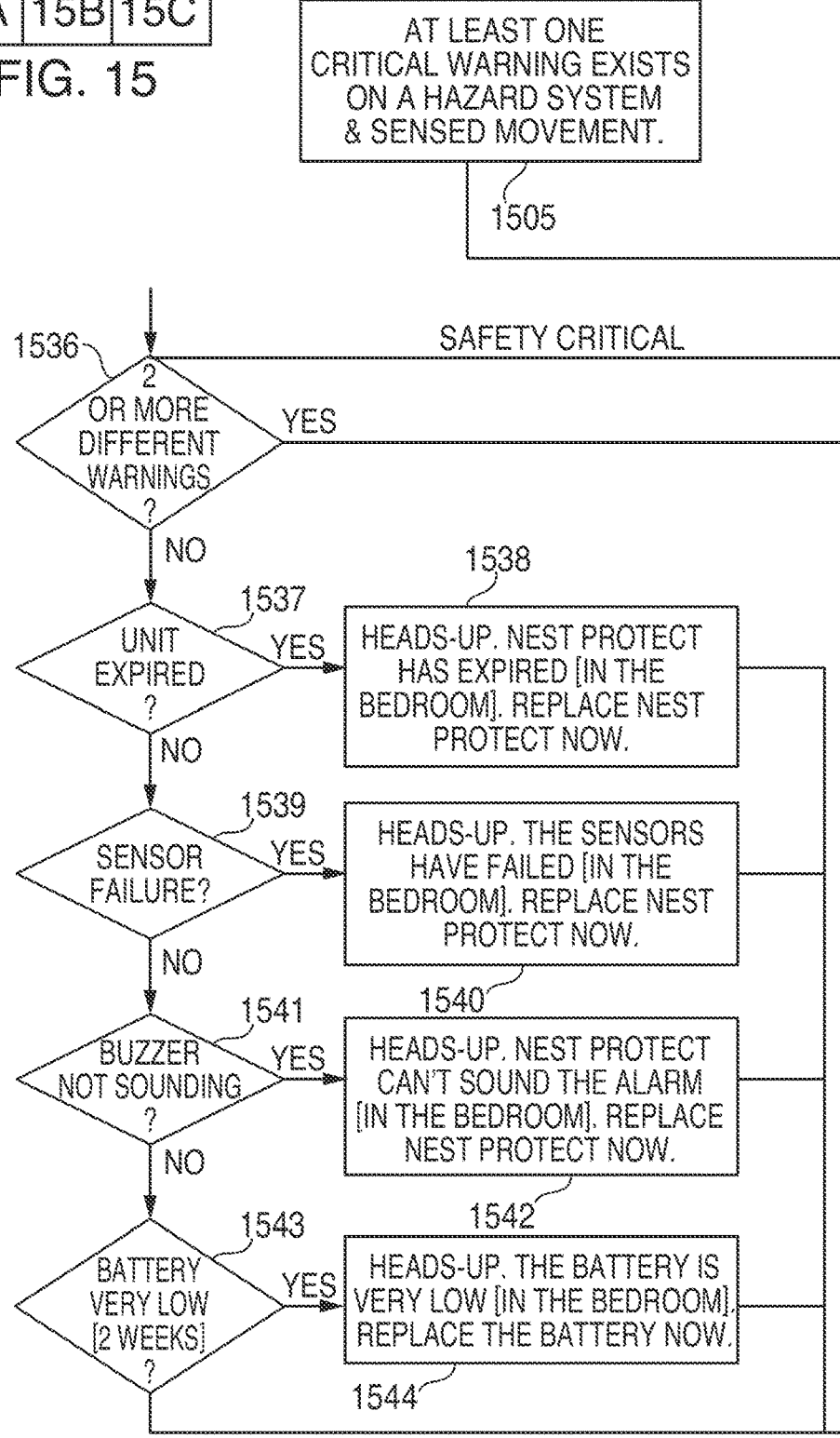

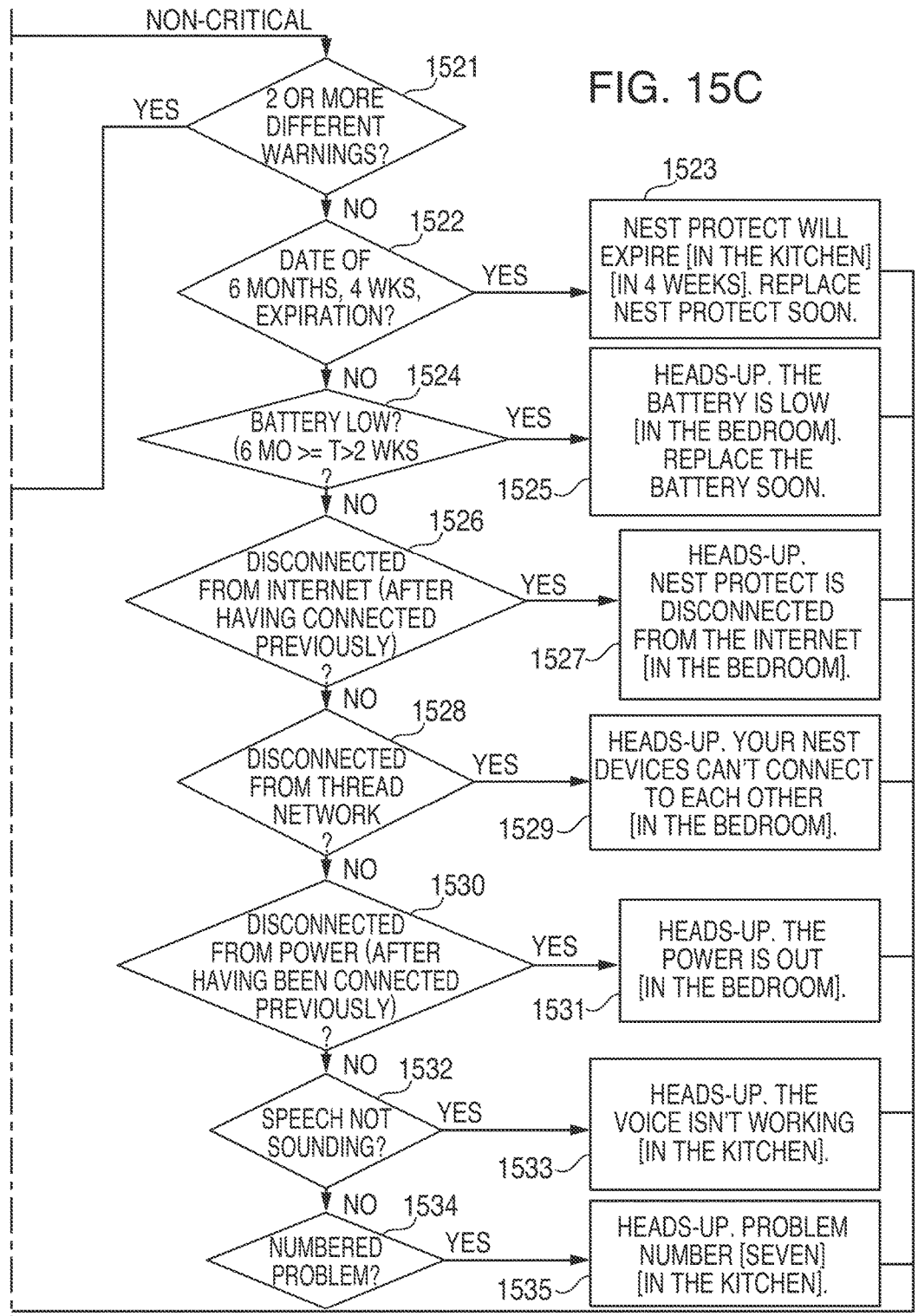

EVENT PRIORITIZATION AND USER INTERFACING FOR HAZARD DETECTION IN MULTI-ROOM SMART-HOME ENVIRONMENT

This patent application is a continuation of U.S. patent application Ser. No. 14/717,769, filed May 20, 2015 (now U.S. Pat. No. 9,685,061), which is incorporated by reference in its entirety for all purposes.

TECHNICAL FIELD

This patent specification relates to systems and methods for providing spoken messages that reflect event status of one or more hazard detection systems within a smart-home environment. More particularly, this specification relates to prioritizing event status and presenting spoken messages according one or more speaking paradigms.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes, office buildings, and other structures. Some of these devices may be hazard detection systems, such as smoke detectors, carbon monoxide detectors, combination smoke and carbon monoxide detectors, or may be other systems for detecting other conditions have been used in residential, commercial, and industrial settings for safety and security considerations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods for providing spoken messages that reflect event status of one or more hazard detection systems within a smart-home environment are described herein. The messages can inform occupants in concise manner that does not overload cognitive recognition of those occupants. For example, the messages may be prioritized to limit the amount of information that is spoken and intelligently condense information in as concise a manner as possible. This may be accomplished by using one or more speaking paradigms to compile audible messages to be played back through a speaker of the hazard detection system.

Recitations of the independent claims will be presented here after they are finalized.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

BRIEF DESCRIPTION OF THE DRAWINGS

FIG. 3 shows an illustrative block diagram showing various components of a hazard detection system working together to provide multi-criteria alarming and pre-alarming functionality, according to some embodiments;

FIG. 4B shows an illustrative alarm priority list that defines priorities of different smoke states and CO states for local and remote device, according to an embodiment;

FIGS. 6A-6C show different illustrative speech paradigms for logically presenting information, according to various embodiments;

FIG. 7 shows an illustrative process for incorporating room speaking logic into an audible message played back through a speaker of a first hazard detection system, according to an embodiment;

FIGS. 10A-10D show different integrated speech and alarm beeps according to various embodiments;

FIGS. 13A-13C show different integrated speech and CO alarm bips according to various embodiments.

FIG. 15A-15C show an illustrative process for providing audible messages for various non-alarm events, according to an embodiment;

DETAILED DESCRIPTION OF THE DISCLOSURE

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more hazard detection embodiments are described further herein in the context of being used in a residential home, such as a single-family residential home, the scope of the present teachings is not so limited. More generally, hazard detection systems are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the hazard detector in the context of one or more scenarios described herein, these references are by no means to be considered as limiting the scope of the present teachings with respect to the person or persons who are performing such actions.

This disclosure relates to automatic self-testing and verification of proper operation of an audible alarming component of a hazard detection system. The hazard detection may include a microphone that can listen to the sound being emitted by the audible alarming component. The use of the microphone can eliminate the need for a human user to be present in order to verify that the alarm component is working. Moreover, the microphone, coupled with processing power of one or more components and/or data provided by other components, can provide intelligent analysis of the performance of the audible alarm. In addition, this combination can be used to control when and how often the self-test is performed, among other features. Additional details on these embodiments are described more fully below.

Figure 1:
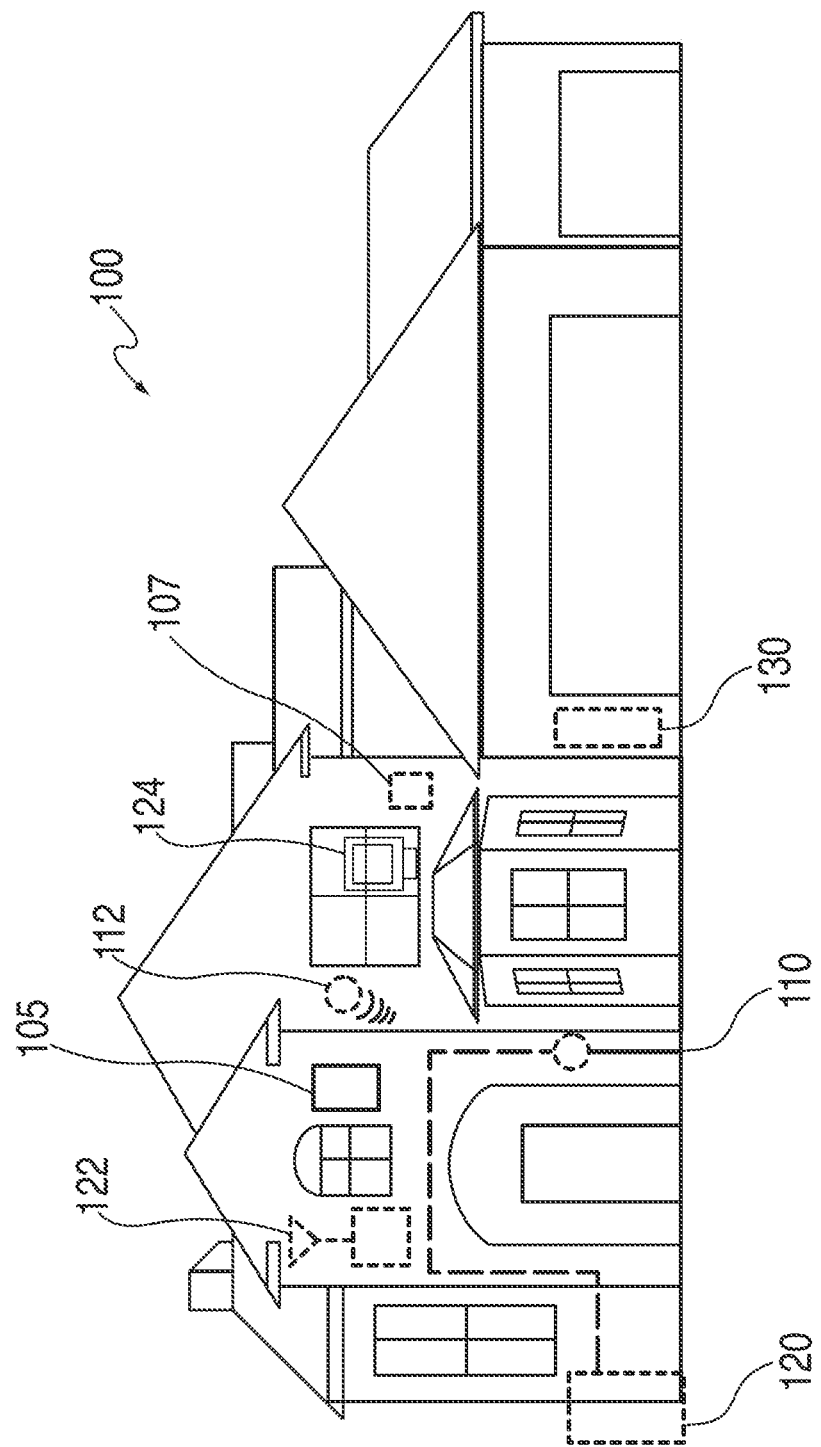
FIG. 1 is a diagram of an enclosure with a hazard detection system, according to some embodiments.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, and central panel 130 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or line powered with a battery backup. Hazard detection system 105 can include one or more processors, multiple sensors, non-volatile storage, and other circuitry to provide desired safety monitoring and user interface features. Some user interface features may only be available in line powered embodiments due to physical limitations and power constraints. In addition, some features common to both line and battery powered embodiments may be implemented differently. Hazard detection system 105 can include the following components: low power wireless personal area network (6LoWPAN) circuitry, a system processor, a safety processor, non-volatile memory (e.g., Flash), WiFi circuitry, an ambient light sensor (ALS), a smoke sensor, a carbon monoxide (CO) sensor, a temperature sensor, a humidity sensor, a noise sensor, one or more ultrasonic sensors, a passive infra-red (PIR) sensor, a speaker, one or more light emitting diodes (LED's), and an alarm buzzer.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, radon, methane and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure), visual safety indicators (e.g., display of a green light indicates that no anomalous conditions are detected), tactile and non-tactile input command processing, and software updates.

Hazard detection system 105 can monitor other conditions that are not necessarily tied to hazards, per se, but can be configured to perform a security role. In the security role, system 105 may monitor occupancy (using a motion detector), ambient light, sound, remote conditions provided by remote sensors (door sensors, window sensors, and/or motion sensors). In some embodiments, system 105 can perform both hazard safety and security roles, and in other embodiments, system 105 may perform one of a hazard safety role and a security role.

Hazard detection system 105 can implement multi-criteria state machines according to various embodiments described herein to provide advanced hazard detection and advanced user interface features such as pre-alarms. In addition, the multi-criteria state machines can manage alarming states and pre-alarming states and can include one or more sensor state machines that can control the alarming states and one or more system state machines that control the pre-alarming states. Each state machine can transition among any one of its states based on sensor data values, hush events, and transition conditions. The transition conditions can define how a state machine transitions from one state to another, and ultimately, how hazard detection system 105 operates. Hazard detection system 105 can use a dual processor arrangement to execute the multi-criteria state machines according to various embodiments. The dual processor arrangement may enable hazard detection system 105 to manage the alarming and pre-alarming states in a manner that uses minimal power while simultaneously providing failsafe hazard detection and alarming functionalities. Additional details of the various embodiments of hazard detection system 105 are discussed below.

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that may control HVAC system 120. Thermostat 110 can be referred to as the "primary" thermostat because it may be electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link (e.g., the fabric network).

Central panel 130 can be part of a security system or other master control system of enclosure 100. For example, central panel 130 may be a security system that may monitor windows and doors for break-ins, and monitor data provided by motion sensors. In some embodiments, central panel 130 can also communicate with one or more of thermostats 110 and 112 and hazard detection systems 105 and 107. Central panel 130 may perform these communications via wired link, wireless link (e.g., the fabric network), or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, and central panel 130. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network services. Public networks like the Internet are sometimes referred to as a Wide-Area Network or WAN.

Access to the Internet, for example, may enable networked devices such as system 105 or thermostat 110 to communicate with a device or server remote to enclosure 100. The remote server or remote device can host an account management program that manages various networked devices contained within enclosure 100. For example, in the context of hazard detection systems according to embodiments discussed herein, system 105 can periodically upload data to the remote server via router 122. In addition, if a hazard event is detected, the remote server or remote device can be notified of the event after system 105 communicates the notice via router 122. Similarly, system 105 can receive data (e.g., commands or software updates) from the account management program via router 122.

Hazard detection system 105 can operate in one of several different power consumption modes. Each mode can be characterized by the features performed by system 105 and the configuration of system 105 to consume different amounts of power. Each power consumption mode corresponds to a quantity of power consumed by hazard detection system 105, and the quantity of power consumed can range from a lowest quantity to a highest quantity. One of the power consumption modes corresponds to the lowest quantity of power consumption, and another power consumption mode corresponds to the highest quantity of power consumption, and all other power consumption modes fall somewhere between the lowest and the highest quantities of power consumption. Examples of power consumption modes can include an Idle mode, a Log Update mode, a Software Update mode, an Alarm mode, a Pre-Alarm mode, a Hush mode, and a Night Light mode. These power consumption modes are merely illustrative and are not meant to be limiting. Additional or fewer power consumption modes may exist. Moreover, any definitional characterization of the different modes described herein is not meant to be all inclusive, but rather, is meant to provide a general context of each mode.

Although one or more states of the sensor state machines and system state machines may be implemented in one or more of the power consumption modes, the power consumption modes and states may be different. For example, the power consumption mode nomenclature is used in connection with various power budgeting systems and methods that are explained in more detail in U.S. Provisional Application Nos. 61/847,905 and 61/847,916.

Figure 2:
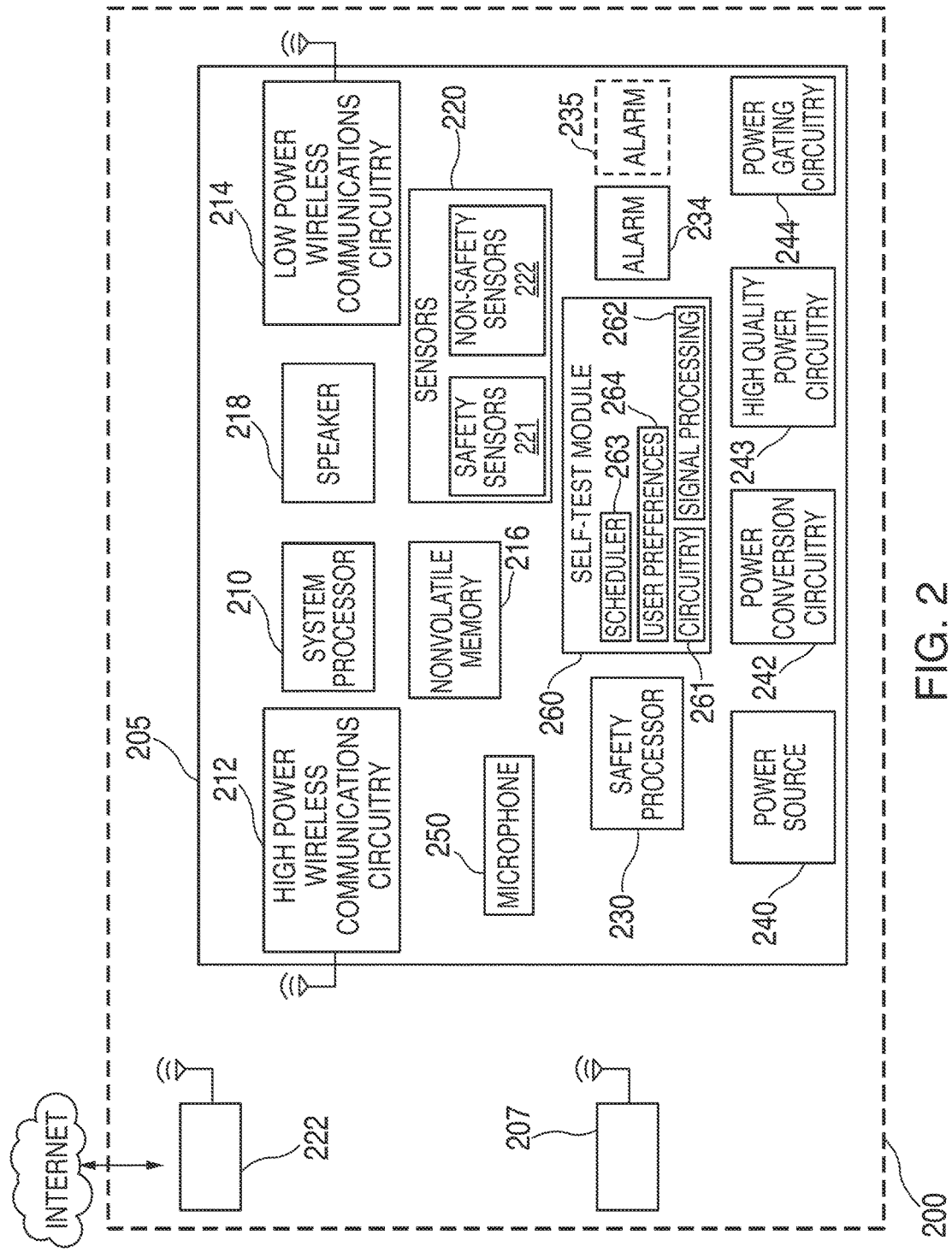
FIG. 2 shows an illustrative block diagram of a hazard detection system being used in an illustrative enclosure, according to some embodiments.

FIG. 2 shows an illustrative block diagram of hazard detection system 205 being used in an illustrative enclosure 200 in accordance with some embodiments. FIG. 2 also shows optional hazard detection system 207 and router 222. Hazard detection systems 205 and 207 can be similar to hazard detection systems 105 and 107 in FIG. 1, enclosure 200 can be similar to enclosure 100 in FIG. 1, and router 222 can be similar to router 122 in FIG. 1. Hazard detection system 205 can include several components, including system processor 210, high-power wireless communications circuitry 212 and antenna, low-power wireless communications circuitry 214 and antenna, non-volatile memory 216, speaker 218, sensors 220, which can include one or more safety sensors 221 and one or more non-safety sensors 222, safety processor 230, alarm 234, power source 240, power conversion circuitry 242, high quality power circuitry 243, power gating circuitry 244 microphone 250, self-check module 260, which can include circuitry 261, signal processing 262, scheduler 263, and user preferences 264. Hazard detection system 205 may be operative to provide failsafe safety detection features and user interface features using circuit topology and power budgeting methods that may minimize power consumption.

Hazard detection system 205 can use a bifurcated processor circuit topology for handling the features of system 205. Both system processor 210 and safety processor 230 can exist on the same circuit board within system 205, but perform different tasks. System processor 210 is a larger more capable processor that can consume more power than safety processor 230. System processor 210 can be operative to process user interface features. For example, processor 210 can direct wireless data traffic on both high and low power wireless communications circuitries 212 and 214, access non-volatile memory 216, communicate with processor 230, and cause audio to be emitted from speaker 218. As another example, processor 210 can monitor data acquired by one or more sensors 220 to determine whether any actions need to be taken (e.g., shut off a blaring alarm in response to a user detected action to hush the alarm).

Safety processor 230 can be operative to handle safety related tasks of system 205. Safety processor 230 can poll one or more of sensors 220 and activate alarm 234 when one or more of sensors 220 indicate a hazard event is detected. Processor 230 can operate independently of processor 210 and can activate alarm 234 regardless of what state processor 210 is in. For example, if processor 210 is performing an active function (e.g., performing a WiFi update) or is shut down due to power constraints, processor 230 can activate alarm 234 when a hazard event is detected. In some embodiments, the software running on processor 230 may be permanently fixed and may never be updated via a software or firmware update after system 205 leaves the factory. In other embodiments, processor 230 may be updated when system 205 is in the field.

Compared to processor 210, processor 230 is a less power consuming processor. Thus by using processor 230 in lieu of processor 210 to monitor a subset of sensors 220 yields a power savings. If processor 210 were to constantly monitor sensors 220, the power savings may not be realized. In addition to the power savings realized by using processor 230 for monitoring the subset of sensors 220, bifurcating the processors also ensures that the safety monitoring and core alarming features of system 205 will operate regardless of whether processor 210 is functioning. By way of example and not by way of limitation, system processor 210 can include a relatively high-powered processor such as Freescale Semiconductor K60 Microcontroller, while safety processor 230 may comprise a relatively low-powered processor such as a Freescale Semiconductor KL16 Microcontroller. Overall operation of hazard detection system 205 entails a judiciously architected cooperation of system processor 210 and safety processor 230, with system processor 210 performing selected higher-level, advanced functions that may not have been conventionally associated with hazard detection units (for example: more advanced user interface and communications functions; various computationally-intensive algorithms to sense patterns in user behavior or patterns in ambient conditions; algorithms for governing, for example, the brightness of an LED night light as a function of ambient brightness levels; algorithms for governing, for example, the sound level of an onboard speaker for home intercom functionality; algorithms for governing, for example, the issuance of voice commands to users; algorithms for uploading logged data to a central server; algorithms for establishing network membership; and so forth), and with safety processor 230 performing the more basic functions that may have been more conventionally associated with hazard detection units (e.g., smoke and CO monitoring, actuation of shrieking/buzzer alarms upon alarm detection). By way of example and not by way of limitation, system processor 210 may consume on the order of 18 mW when it is in a relatively high-power active state and performing one or more of its assigned advanced functionalities, whereas safety processor 230 may only consume on the order of 0.05 mW when it is performing its basic monitoring functionalities. However, again by way of example and not by way of limitation, system processor 210 may consume only on the order of 0.005 mW when in a relatively low-power inactive state, and the advanced functions that it performs are judiciously selected and timed such the system processor is in the relatively high power active state only about 0.05% of the time, and spends the rest of the time in the relatively low-power inactive state. Safety processor 230, while only requiring an average power draw of 0.05 mW when it is performing its basic monitoring functionalities, should of course be performing its basic monitoring functionalities 100% of the time. According to one or more embodiments, the judiciously architected functional overlay of system processor 210 and safety processor 230 is designed such that hazard detection system 205 can perform basic monitoring and shriek/buzzer alarming for hazard conditions even in the event that system processor 210 is inactivated or incapacitated, by virtue of the ongoing operation of safety processor 230. Therefore, while system processor 210 is configured and programmed to provide many different capabilities for making hazard detection unit 205 an appealing, desirable, updatable, easy-to-use, intelligent, network-connected sensing and communications node for enhancing the smart-home environment, its functionalities are advantageously provided in the sense of an overlay or adjunct to the core safety operations governed by safety processor 230, such that even in the event there are operational issues or problems with system processor 210 and its advanced functionalities, the underlying safety-related purpose and functionality of hazard detector 205 by virtue of the operation of safety processor 230 will continue on, with or without system processor 210 and its advanced functionalities.

High power wireless communications circuitry 212 can be, for example, a Wi-Fi module capable of communicating according to any of the 802.11 protocols. For example, circuitry 212 may be implemented using WiFi part number BCM43362, available from Murata. Depending on an operating mode of system 205, circuitry 212 can operate in a low power "sleep" state or a high power "active" state. For example, when system 205 is in an Idle mode, circuitry 212 can be in the "sleep" state. When system 205 is in a non-Idle mode such as a Wi-Fi update mode, software update mode, or alarm mode, circuitry 212 can be in an "active" state. For example, when system 205 is in an active alarm mode, high power circuitry 212 may communicate with router 222 so that a message can be sent to a remote server or device.

Low power wireless communications circuitry 214 can be a low power Wireless Personal Area Network (6LoWPAN) module or a ZigBee module capable of communicating according to a 802.15.4 protocol. In some embodiments, low power wireless communications circuitry 214 may serve as a node in a fabric network of devices. In another embodiment, circuitry 214 can be part number EM357 SoC available from Silicon Laboratories. In some embodiments, circuitry 214 can include Bluetooth Low Energy circuitry. Depending on the operating mode of system 205, circuitry 214 can operate in a relatively low power "sleep" state or a relatively high power "awake" state. When system 205 is in the Idle mode, WiFi update mode, or software update mode, circuitry 214 can be in the "sleep" state. Circuitry 214 may transition from the sleep state to the awake state in response to receipt of a wake packet (transmitted by another device) or in response to a state change in one of the state machines running on system 205. When system 205 is in the Alarm mode, circuitry 214 can transmit fabric messages so that the low power wireless communications circuitry in system 207 can receive data indicating that system 205 is alarming. Thus, even though it is possible for high power wireless communications circuitry 212 to be used for listening for alarm events, it can be more power efficient to use low power circuitry 214 for this purpose. Power savings may be further realized when several hazard detection systems or other systems having low power circuitry 214 form an interconnected wireless fabric network. For some embodiments, circuitry 214 can be a Thread module, corresponding to one particularly useful protocol known as Thread, which is promulgated by the Thread Group and based on 802.15.4, IETF IPv6, and 6LoWPAN.

Power savings may also be realized because in order for low power circuitry 214 to continually listen for data transmitted from other low power circuitry, circuitry 214 may constantly be operating in its "sleep" state. This state consumes power, and although it may consume more power than high power circuitry 212 operating in its sleep state; the power saved versus having to periodically activate high power circuitry 214 can be substantial. When high power circuitry 212 is in its active state and low power circuitry 214 is in its awake state, high power circuitry 212 can consume substantially more power than low power circuitry 214.

In some embodiments, low power wireless communications circuitry 214 can be characterized by its relatively low power consumption and its ability to wirelessly communicate according to a first protocol characterized by relatively low data rates, and high power wireless communications circuitry 212 can be characterized by its relatively high power consumption and its ability to wirelessly communicate according to a second protocol characterized by relatively high data rates.

In some embodiments, low power wireless communications circuitry 214 may be a mesh network compatible module that does not require a distinguished access point in order to communicate to devices in a network. Mesh network compatibility can include provisions that enable mesh network compatible modules to keep track of other nearby mesh network compatible modules so that data can be passed through neighboring modules. Mesh network compatibility is essentially the hallmark of the 802.15.4 protocol. In contrast, high power wireless communications circuitry 212 is not a mesh network compatible module and requires an access point in order to communicate to devices in a network. Thus, if a first device having circuitry 212 wants to communicate data to another device having circuitry 212, the first device has to communicate with the access point, which then transmits the data to the second device. There is no device-to-device communication per se using circuitry 212.

Non-volatile memory 216 can be any suitable permanent memory storage such as, for example, NAND Flash, a hard disk drive, NOR, ROM, or phase change memory. In one embodiment, non-volatile memory 216 can store audio clips that can be played back by speaker 218. The audio clips can include installation instructions or warnings in one or more languages. Speaker 218 can be any suitable speaker operable to playback sounds or audio files. Speaker 218 can include an amplifier (not shown).

Sensors 220 can be monitored by system processor 210 and safety processor 230, and can include safety sensors 221 and non-safety sensors 222. One or more of sensors 220 may be exclusively monitored by one of system processor 210 and safety processor 230. As defined herein, monitoring a sensor refers to a processor's ability to acquire data from that monitored sensor. That is, one particular processor may be responsible for acquiring sensor data, and possibly storing it in a sensor log, but once the data is acquired, it can be made available to another processor either in the form of logged data or real-time data. For example, in one embodiment, system processor 210 may monitor one of non-safety sensors 222, but safety processor 230 cannot monitor that same non-safety sensor. In another embodiment, safety processor 230 may monitor each of the safety sensors 221, but may provide the acquired sensor data to system processor 210.

Safety sensors 221 can include sensors necessary for ensuring that hazard detection system 205 can monitor its environment for hazardous conditions and alert users when hazardous conditions are detected, and all other sensors not necessary for detecting a hazardous condition are non-safety sensors 222. In some embodiments, safety sensors 221 include only those sensors necessary for detecting a hazardous condition. For example, if the hazardous condition includes smoke and fire, then the safety sensors might only include a smoke sensor, at least one temperature sensor and a relative humidity sensor. Other sensors, such as non-safety sensors, could be included as part of system 205, but might not be needed to detect smoke or fire. As another example, if the hazardous condition includes carbon monoxide, then the safety sensor might be a carbon monoxide sensor, and no other sensor might be needed to perform this task.

Thus, sensors deemed necessary can vary based on the functionality and features of hazard detection system 205. In one embodiment, hazard detection system 205 can be a combination smoke, fire, and carbon monoxide alarm system. In such an embodiment, detection system 205 can include the following necessary safety sensors 221: a smoke detector, a carbon monoxide (CO) sensor, and one or more temperature sensors. Smoke detectors typically use optical detection, ionization, or air sampling techniques to trigger the smoke condition. Optical scattering and obscuration detection techniques may use infrared light emitting diodes (LEDs) and photodiodes. When smoke and/or other matter (e.g., water vapor) enters a smoke chamber, the light emitted by the LED(s) is scattered, which enables the photodiodes to detect the light. If no smoke or other matter (e.g., water vapor) is in the smoke chamber, then the photodiodes are not be able to detect the light being emitted by the LED(s). In some embodiments, multiple LEDs may be incorporated in the smoke sensor. Each LED may emit light energy at different wavelengths. Ionization techniques may use a radioactive material such as Americium-241 to ionize the air, which creates a measurable current between detector two plates. When smoke particles enter the chamber, they bind to the ions. The reaction produces a measurable drop in the conducted current between detector plates; the resulting drop indicates smoke detection. In some geographic locations (e.g., Europe) traditional Americium-241 ionization smoke detectors are banned by regulatory agencies in part because of the necessity to dispose of a radioactive material at the end of the smoke detector's life. A smoke detector can also use a non-radioactive ionization technique to detect the presence of smoke and/or other particulate matter. A non-radioactive ionizing detector may use a LED such as an ultraviolet emitting LED with a photocatalyst coating. The photocatalyst generates ions when light (e.g., UV light)

passes through it. When these ions are displaced or neutralized by smoke and/or other matter, the detector detects a change in current between two plates and registers a smoke event.

A CO sensor can detect the presence of carbon monoxide gas, which, in the home, is typically generated by open flames, space heaters, water heaters, blocked chimneys, and automobiles. The material used in electrochemical CO sensors typically has a 5-7 year lifespan. Thus, after a 5-7 year period has expired, the CO sensor should be replaced. A heat sensor can be a thermistor, which is a type of resistor whose resistance varies based on temperature. Thermistors can include negative temperature coefficient (NTC) type thermistors or positive temperature coefficient (PTC) type thermistors. A relative humidity sensor may be used to distinguish between obscuration caused by smoke and steam or fog. Furthermore, in this embodiment, detection system 205 can include the following non-safety sensors 222: a humidity sensor, an ambient light sensor, a push-button sensor, a passive infra-red (PIR) sensor, one or more ultrasonic sensor, an accelerometer, and a camera. A temperature and humidity sensor can provide relatively accurate readings of temperature and relative humidity for the purposes of environmental monitoring and HVAC control. An ambient light sensor (ALS) can detect ambient light and the push-button sensor can be a switch, for example, that detects a user's press of the switch. A PIR sensor can be used for various motion detection features. A camera can also detect motion. An accelerometer may detect motion and vibrations. Ultrasonic sensors can be used to detect the presence of an object. Such sensors can generate high frequency sound waves and determine which wave(s) are received back by the sensor. Sensors 220 can be mounted to a printed circuit board (e.g., the same board that processors 210 and 230 may be mounted to), a flexible printed circuit board, a housing of system 205, or a combination thereof.

In some embodiments, data acquired from one or more non-safety sensors 222 can be acquired by the same processor used to acquire data from one or more safety sensors 221. For example, safety processor 230 may be operative to monitor both safety and non-safety sensors 221 and 222 for power savings reasons, as discussed above. Although safety processor 230 may not need any of the data acquired from non-safety sensor 222 to perform its hazard monitoring and alerting functions, the non-safety sensor data can be utilized to provide enhanced hazard system 205 functionality. In some embodiments, non-safety sensors 222 can include microphone 250, ultrasonic sensors (not shown), accelerometer (not shown), external motion detector (not shown), and camera (not shown). Each of these sensors may provide their signals to sound check module 260.

Alarm 234 can be any suitable alarm that audibly alerts users in the vicinity of system 205 of the presence of a hazard condition. Alarm 234 can also be activated during self-testing scenarios according to various embodiments discussed here. Alarm 234 can be a piezo-electric buzzer, for example, that emits an audible alarm at a fixed frequency or within a range of frequencies. An exemplary fixed frequency can include 3 kHz or 520 Hz. In some embodiments, alarm 234 can emit alarm sounds at two different frequencies at intermittent intervals.

System 205 can optionally include alarm 235, which may be another alarm that audibly produces a sound to alert the presence of a hazard condition. Alarm 235 may also be activated during self-testing. Alarm 235 may be also be a piezo-electric buzzer. Alarm 235 may emit a sound a fixed frequency different than that emitted by alarm 234. For example, alarm 234 may emit sound at a first frequency (e.g., 3 kHz) and alarm 235 may emit sound at a second frequency (e.g., 520 Hz). During an alarming event, for example, alarms 234 and 235 may take turns sounding their respective alarms. For example, alarm 234 may sound for a first interval, during which time, it may sound continuously or intermittently, and after the first interval ends, alarm 235 may sound for a second interval. During the second interval, alarm 235 may sound continuously or intermittently. If desired, additional alarms may be included in system 205. In some embodiments, system 205 may only include an alarm that sounds at frequency of 520 Hz.

Power source 240 can supply power to enable operation of system 205 and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments. Battery powered embodiments are designed to manage power consumption of its finite energy supply such that hazard detection system 205 operates for a minimum period of time. In some embodiments, the minimum period of time can be one (1) year, three (3) years, or seven (7) years. In other embodiments, the minimum period of time can be at least seven (7) years, eight (8) years, nine (9) years, or ten (10) years. Line powered embodiments are not as constrained because their energy supply is virtually unlimited. Line powered with battery backup embodiments may employ power conservation methods to prolong the life of the backup battery.

In battery only embodiments, power source 240 includes one or more batteries or a battery pack. The batteries can be constructed from different compositions (e.g., alkaline or lithium iron disulfide) and different end-user configurations (e.g., permanent, user replaceable, or non-user replaceable) can be used. In one embodiment, six cells of Li—FeS2 can be arranged in two stacks of three. Such an arrangement can yield about 27000 mWh of total available power for system 205.

Power conversion circuitry 242 includes circuitry that converts power from one level to another. Multiple instances of power conversion circuitry 242 may be used to provide the different power levels needed for the components within system 205. One or more instances of power conversion circuitry 242 can be operative to convert a signal supplied by power source 240 to a different signal. Such instances of power conversion circuitry 242 can exist in the form of buck converters or boost converters. For example, alarm 234 may require a higher operating voltage than high power wireless communications circuitry 212, which may require a higher operating voltage than processor 210, such that all required voltages are different than the voltage supplied by power source 240. Thus, as can be appreciated in this example, at least three different instances of power conversion circuitry 242 are required.

High quality power circuitry 243 is operative to condition a signal supplied from a particular instance of power conversion circuitry 242 (e.g., a buck converter) to another signal. High quality power circuitry 243 may exist in the form of a low-dropout regulator. The low-dropout regulator may be able to provide a higher quality signal than that provided by power conversion circuitry 242. Thus, certain components may be provided with "higher" quality power than other components. For example, certain safety sensors 221 such as smoke detectors and CO sensors require a more stable voltage in order to operate properly than digital circuitry within the system processor 210. As will be explained in more detail below, power circuitry may be customized to provide specific power signals for each LED being used in the smoke sensor.

Power gating circuitry 244 can be used to selectively couple and de-couple components from a power bus. De-coupling a component from a power bus insures that the component does not incur any quiescent current loss, and therefore can extend battery life beyond that which it would be if the component were not so de-coupled from the power bus. Power gating circuitry 244 can be a switch such as, for example, a MOSFET transistor. Even though a component is de-coupled from a power bus and does not incur any current loss, power gating circuitry 244 itself may consume a small amount of power. This power consumption, however, is less than the quiescent power loss of the component.

Microphone 250 may be a separate and independent component specifically designed to receive acoustic energy (e.g., sound) and translate it into an electrical signal. Microphone 250 may be located adjacent to an external surface of system 205 or located wholly within the interior of system 205. Microphone 250 may be MEMS microphone, for example.

As an alternative to including microphone 250 in system 205, speaker 218 may be used as a microphone when it is not being used to delivery messages. Using speaker 218 as a microphone repurposes an already existing component without incurring additional cost for a separate microphone such as microphone 250. Thus, during a self-test operation, the acoustic energy emitted by alarm 234 or 235 may be received and processed by speaker 218. As yet another alternative, if both alarms 234 and 235 are present in system 205, one of the alarms may function as a microphone while the other alarm functions as an alarm. Thus, when the first alarm is alarming, the second alarm may "listen" for sound being emitted by the first alarm, and vice versa.

Ultrasonic sensor 259 may also be used to verify the operation of alarm 234 and/or alarm 235. Although ultrasonic sensor 259 is tuned at about 40 kHz, it can pick up higher harmonics of a base frequency of alarm 234, thereby validating its operation. Because alarm 234 is extremely loud, it tends to generate a strong acoustic and electromagnetic signal within other sensors. In one implementation, alarm 234 sounds at 85 dB @ 3 m, at a frequency of 3 kHz. Even though ultrasonic sensor 259 may be tuned to emit and detect signals at 40 kHz—well above normal human hearing, it may detect the 11th and 12th harmonics (33 kHz and 36 kHz) of the loud sound being transmitted by alarm 234. These harmonics are both within the detection range of ultrasonic sensor 259. Alarm 234 may have a complex (harmonic-full) waveform, and thus the 11th and 12th and further harmonics are also quite loud. No additional circuitry is required for ultrasonic sensor 259 to clearly indicate that alarm 234 is sounding. It should be understood that all information gathered from alarm 234 is invalid for any use originally intended for sensor 259, but only during the period during which alarm 234 is sounding. In addition, in this invention alarm 234 is providing electromagnetic interference to the operation of sensor 259.

An accelerometer (not shown) may be a MEMS device capable of detecting motion. Accelerometer 254 may be used for several different purposes including automated self-test of alarm 234 and/or alarm 235. For example, accelerometer 254 may be used to determine an orientation in which system is mounted to a fixed surface (e.g., a wall or ceiling). It may be used to determine whether system 205 is being moved for theft detection. Additionally, accelerometer 254 may be used to detect vibration caused by an active alarm. That is, when alarm 234 is emitting its alarm signal, the vibration induced in the system in response thereto may be detected by the accelerometer. If the vibration signal sufficiently matches an expected data profile or exceeds a threshold, system 205 may determine that alarm 234 is operating according to desired specifications.

An external motion detector 256 (not shown) may be a device capable of detecting motion external to system 205. For example, detector 256 may be a passive infrared motion detector. A camera (not shown) may be another device capable of detecting motion or presence of occupants within a structure. Motion data may be used with the automatic self-test system to determine the best time to perform a self-test. Since the alarm 234 is loud, it may be desirable to perform the self-test when the occupants are not present in order to avoid disturbing the occupants.

System 205 can include a variety of sound verification sources. A sound verification source is a device or component that can detect audio signals being emitted by the alarm and/or buzzer. The sound verification sources can include a microphone, alarm, speaker, ultrasonic sensor, accelerometer, or capacitive sensor. These sound verification sources may feed their signals to sound check module 260 for analysis. In some embodiments, the sound verification source can be located remote to system 205. For example, a microphone in a phone can be used to detect audio signals being emitted by system 205.

Self-test module 260 may control self-tests to verify operation of one or more components of system 200. For example, the self-test may verify operation of the sensors 220, power source 240, alarm 234, and microphone 250. One of the test may be a sound test to verify that the alarms 234 and 235 and speaker 218 are operating at a minimum specified loudness and frequency. Self-test module 260 may include circuitry 261 and signal processing 262 for processing signals received from a sound verification source. In some embodiments, circuitry 261 may include digital filters and signal processing 262 may include code that interprets signals provided by the circuitry 261. In some embodiments, circuitry 261 and signal processing 262 may embody a spectral analyzer that analyzes audio signals to determine whether the alarm and/or speaker is emitting a signal at a desired frequency. Self-test module 260 may perform a myriad of analyses on the received audio signal. These analyses may determine amplitude, frequency, and duration of the audio signal being emitted by the alarm. These analyses may be cataloged over time to determine if there is any deterioration in performance.

It is understood that although hazard detection system 205 is described as having two separate processors, system processor 210 and safety processor 230, which may provide certain advantages as described hereinabove and hereinbelow, including advantages with regard to power consumption as well as with regard to survivability of core safety monitoring and alarming in the event of advanced feature provision issues, it is not outside the scope of the present teachings for one or more of the various embodiments discussed herein to be executed by one processor or by more than two processors.

FIG. 3 shows an illustrative block diagram showing various components of hazard detection system 300 working together to provide multi-criteria alarming and pre-alarming functionalities according to various embodiments. As shown, system 300 can include sensor data 302, hush detection events 304, transition conditions 306, threshold adjustment parameter 307, multi-criteria state machines 310, clock 312, other states 320, alarming states 330, pre-alarming states 340, alarm 350, display 352, speaker 354, and wireless circuitry 380. Also shown are several communication links 370, each of which may have unidirectional or bidirectional data and/or signal communications capabilities. Multi-criteria state machines 310 can control alarming states 330, pre-alarming states 340, and all other state machine states 320 based on sensor data 302, hush detection events 304, transition conditions 306, clock 312, and other criteria, and alarming and pre-alarming states 330 and 340 can control the output of alarm 350, display 352, and speaker 354. Alarming states 330 can include multiple alarming states (e.g., one for each hazard, such as smoke alarming state 331, CO alarming state 332, and heat alarming state 333) and pre-alarming states 340 can include multiple pre-alarming states (e.g., one or more for each hazard, such as smoke pre-alarming state 341 and CO pre-alarming state 342. Other states can include, for example, idling states, monitoring states, alarm hushing states, pre-alarm hushing states, post-alarm states, holding states, and alarm monitoring states.

Alarming states 330 can control activation and deactivation of alarm 350 and display 352 in response to determinations made by multi-criteria state machines 310. Alarm 350 can provide audible cues (e.g., in the form of buzzer beeps) that a dangerous condition is present. Display 352 can provide a visual cue (e.g., such as flashing light or change in color) that a dangerous condition is present. If desired, alarming states 330 can control playback of messages over speaker 354 in conjunction with the audible and/or visual cues. For example, combined usage of alarm 350 and speaker 354 can repeat the following sequence: "BEEP, BEEP, BEEP—Smoke Detected In Bedroom—BEEP BEEP BEEP," where the "BEEPS" emanate from alarm 350 and "smoke detected in bedroom" emanates from speaker 354. As another example, usage of alarm 350 and speaker 354 can repeat the following sequence: "BEEP, BEEP, BEEP—Wave to Hush Alarm—BEEP BEEP BEEP," in which speaker 354 is used to provide alarming hush instructions. Any one of the alarming states 330 (e.g., smoke alarm state 331, CO alarm state 332, and heat alarm state 333) can independently control alarm 350 and/or display 352 and/or speaker 354. In some embodiments, alarming states 330 can cause alarm 350 or display 352 or speaker 354 to emit different cues based on which specific alarm state is active. For example, if a smoke alarm state is active, alarm 350 may emit a sound having a first characteristic, but if a CO alarm state is active, alarm 350 may emit a sound having a second characteristic. In other embodiments, alarming states 330 can cause alarm 350 and display 352 and speaker 354 to emit the same cue regardless of which specific alarm state is active.

Pre-alarming states 340 can control activation and deactivation of speaker 354 and display 352 in response to determinations made by multi-criteria state machines 310. Pre-alarming can serve as a warning that a dangerous condition may be imminent. Speaker 354 may be utilized to playback voice warnings that a dangerous condition may be imminent. Different pre-alarm messages may be played back over speaker 354 for each type of detected pre-alarm event. For example, if a smoke pre-alarm state is active, a smoke related message may be played back over speaker 354. If a CO pre-alarm state is active, a CO related message may be played back. Furthermore, different messages may be played back for each one of the multiple pre-alarms associated with each hazard (e.g., smoke and CO). For example, the smoke hazard may have two associated pre-alarms, one associated with a first smoke pre-alarming state (e.g., suggesting that an alarming state may be moderately imminent) and another one associated with a second smoke pre-alarming state (e.g., suggesting that an alarming state may be highly imminent). Pre-alarm messages may also include voice instructions on how to hush pre-alarm messages. Display 352 may also be utilized in a similar fashion to provide visual cues of an imminent alarming state. In some embodiments, the pre-alarm messages can specify the location of the pre-alarming conditions. For example, if hazard system 300 knows it is located in the bedroom, it can incorporate the location in the pre-alarm message: "Smoke Detected In Bedroom."

Hazard detection system 300 can enforce alarm and pre-alarm priorities depending on which conditions are present. For example, if elevated smoke and CO conditions exist at the same time, the smoke alarm state and/or pre-alarm smoke state may take precedence over the CO alarm state and/or CO pre-alarm state. If a user silences the smoke alarm or smoke pre-alarm, and the CO alarm state or CO pre-alarm state is still active, system 300 may provide an indication (e.g., a voice notification) that a CO alarm or pre-alarm has also been silenced. If a smoke condition ends and the CO alarm or pre-alarm is event is still active, the CO alarm or pre-alarm may be presented to the user.

Multi-criteria state machines 310 can transition to an idling state when it determines that relatively little or no dangerous conditions exist. The idling state can enforce a relatively low level of hazard detection system activity. For example, in the idle state, the data sampling rates of one or more sensors may be set at relatively slow intervals. Multi-criteria state machines 310 can transition to a monitoring state when it determines that sensor data values have raised to a level that warrants closer scrutiny, but not to a level which transitions to a pre-alarming or alarming state. The monitoring state can imply a relatively high level of hazard detection system activity. For example, in the monitoring state, the data sampling rates of one or more sensors may be much greater than in the idle state. In addition, the data sampling rates of one or more sensors may be set at relatively fast intervals for alarming states 330, pre-alarming states 340, or both.

Alarm hushing and pre-alarm hushing states may refer to a user-instructed deactivation of an alarm or a pre-alarm for a predetermined amount of time. For example, in one embodiment, a user can press a button (not shown) to silence an alarm or pre-alarm. In another embodiment, a user can perform a hush gesture in the presence of the hazard detection system. A hush gesture can be a user initiated action in which he or she performs a gesture (e.g., a wave motion) in the vicinity of system 300 with the intent to turn off or silence a blaring alarm. One or more ultrasonic sensors, a PIR sensor, or a combination thereof can be used to detect this gesture. In another approach, wireless circuitry 370 may receive instructions to hush the alarm. For example, a user may use his or her phone to transmit a hush command via a wireless protocol (e.g., Bluetooth low energy) to system 300, whereupon wireless circuitry 380 may forward that command to trigger a hush detection event 304.

Post-alarming states may refer to states that multi-criteria state machines 310 can transition to after having been in one of alarming states 330 or one of pre-alarming states 340. In one post-alarming state, hazard detection system 300 can provide an "all clear" message to indicate that the alarm or pre-alarm condition is no longer present. This can be especially useful, for example, for CO because humans cannot detect CO. Another post-alarming state can be a holding state, which can serve as a system debounce state. This state can prevent hazard detection system 300 from immediately transitioning back to a pre-alarming state 340 after having just transitioned from an alarming state 330.

Multi-criteria state machines 310 can include several different state machines: sensor state machines and system state machines. Each state machine can be associated with a particular hazard such as, for example, a smoke hazard, a carbon monoxide hazard, or a heat hazard, and the multi-criteria state machines may leverage data acquired by one or more sensors in managing detection of a hazard. In some embodiments, a sensor state machine can be implemented for each hazard. In other embodiments, a system state machine may be implemented for each hazard or a subset of hazards. The sensor state machines can be responsible for controlling relatively basic hazard detection system functions and the system state machines can be responsible for controlling relatively advanced hazard detection system functions. In managing detection of a hazard, each sensor state machine and each system state machine can transition among any one of its states based on sensor data 302, hush events 304, and transition conditions 306. A hush event can be a user initiated command to hush, for example, a sounding alarm or pre-alarm voice instruction.

Transition conditions 306 can include a myriad of different conditions that may define how a state machine transitions from one state to another. Each state machine can have its own set of transition conditions. The conditions can define thresholds that may be compared against any one or more of the following inputs: sensor data values, time clocks, and user interaction events (e.g., hush events). State change transitions can be governed by relatively simple conditions (e.g., single-criteria conditions), or relatively complex conditions (e.g., multi-criteria conditions). Single-criteria conditions may compare one input to one threshold. For example, a simple condition can be a comparison between a sensor data value and a threshold. If the sensor data value equals or exceeds the threshold, the state change transition may be executed. In contrast, a multi-criteria condition can be a comparison of one or more inputs to one or more thresholds. For example, a multi-criteria condition can be a comparison between a first sensor value and a first threshold and a comparison between a second sensor value and a second threshold. In some embodiments, both comparisons would need to be satisfied in order to effect a state change transition. In other embodiments, only one of the comparisons would need to be satisfied in order to effect a state change transition. As another example, a multi-criteria condition can be a comparison between a time clock and a time threshold and a comparison between a sensor value and a threshold.

In some embodiments, the threshold for a particular transition condition can be adjusted. Such thresholds are referred to herein as adjustable thresholds (e.g., shown as part of transition conditions 306). The adjustable threshold can be changed in response to threshold adjustment parameter 307, which may be provided, for example, by an alarm threshold setting module according to an embodiment. Adjustable thresholds can be selected from one of at least two different selectable thresholds, and any suitable selection criteria can be used to select the appropriate threshold for the adjustable threshold. In one embodiment, the selection criteria can include several single-criteria conditions or a multi-criteria condition. In another embodiment, if the adjustable threshold is compared to sensor values of a first sensor, the selection criteria can include an analysis of at least one sensor other than the first sensor. In another embodiment, the adjustable threshold can be the threshold used in a smoke alarm transition condition, and the adjustable threshold can be selected from one of three different thresholds.

In some embodiments, the threshold for a particular transition condition can be a learned condition threshold (not shown). The learned condition threshold can be the result of a difference function, which may subtract a constant from an initial threshold. The constant can be changed, if desired, based on any suitable number of criteria, including, for example, heuristics, field report data, software updates, user preferences, device settings, etc. Changing the constant can provide a mechanism for changing the transition condition for one or more states (e.g., a pre-alarming state). This constant can be provided to transition conditions 306 to make adjustments to the learned condition threshold. In one embodiment, the constant can be selected based on installation and setup of hazard detection system 300. For example, the home owner can indicate that hazard detection system 300 has been installed in a particular room of an enclosure. Depending on which room it is, system 300 can select an appropriate constant. For example, a first constant can be selected if the room is a bedroom and a second constant can be selected if the room is a kitchen. The first constant may be a value that makes hazard detection system 300 more sensitive to potential hazards than the second constant because the bedroom is in a location that is generally further away from an exit and/or is not generally susceptible to factors that may otherwise cause a false alarm. In contrast, the kitchen, for example, is generally closer to an exit than a bedroom and can generate conditions (e.g., steam or smoke from cooking) that may cause a false alarm. Other installation factors can also be taken into account in selecting the appropriate constant. For example, the home owner can specify that the room is adjacent to a bathroom. Since humidity stemming from a bathroom can cause false alarms, hazard system 300 can select a constant that takes this into account. As another example, the home owner can specify that the room includes a fireplace. Similarly, hazard system 300 can select a constant that takes this factor into account.

In another embodiment, hazard detection system 300 can apply heuristics to self-adjust the constant. For example, conditions may persist that keep triggering pre-alarms, but the conditions do not rise to alarming levels. In response to such persistent pre-alarm triggering, hazard detection system 300 can modify the constant so that the pre-alarms are not so easily triggered. In yet another embodiment, the constant can be changed in response to a software update. For example, a remote server may analyze data acquired from several other hazard detection systems and adjust the constant accordingly, and push the new constant to hazard detection system 300 via a software update. In addition, the remote server can also push down constants based on user settings or user preferences to hazard detection system 300. For example, the home owner may be able to define a limited number of settings by directly interacting with hazard detection system 300. However, the home owner may be able to define an unlimited number of settings by interacting with, for example, a web-based program hosted by the remote server. Based on the settings, the remote server can push down one or more appropriate constants.

The sensor state machines can control alarming states 330 and one or more of other states 320. In particular, smoke sensor state machine 314 can control smoke alarm state 331, CO sensor state machine 316 can control CO alarming state 332, and heat sensor state machine 318 can control heat alarming state 333. For example, smoke sensor state machine 314 may be operative to sound alarm 350 in response to a detected smoke event. As another example, CO sensor state machine 316 can sound alarm 350 in response to a detected CO event. As yet another example, heat sensor state machine 318 can sound alarm 350 in response to a detected heat event. In some embodiments, a sensor state machine can exercise exclusive control over one or more alarming states 330.

The system state machines can control pre-alarming states 340 and one or more of other states 320. In particular, smoke system state machine 315 may control smoke pre-alarm state 341, and CO system state machine 317 may control CO pre-alarm state 342. In some embodiments, each system state machine can manage multiple pre-alarm states. For example, a first pre-alarm state may warn a user that an abnormal condition exists, and a second pre-alarm state may warn the user that the abnormal condition continues to exist. Moreover, each system state machine can manage other states that cannot be managed by the sensor state machines. For example, these other states can include a monitoring state, a pre-alarm hushing state, and post-alarm states such as holding and alarm monitoring states.

The system state machines can co-manage one or more states with sensor state machines. These co-managed states ("shared states") can exist as states in both system and sensor state machines for a particular hazard. For example, smoke system state machine 315 may share one or more states with smoke sensor state machine 314, and CO system state machine 317 may share one or more states with CO sensor state machine 316. The joint collaboration between system and sensor state machines for a particular hazard is shown by communications link 370, which connects the two state machines. In some embodiments, any state change transition to a shared state may be controlled by the sensor state machine. For example, the alarming state may be a shared state, and anytime a sensor state machine transitions to the alarming state, the system state machine that co-manages states with that sensor state machine may also transition to the alarming state. In some embodiments, shared states can include idling states, alarming states, and alarm hushing states.

Figure 4A:
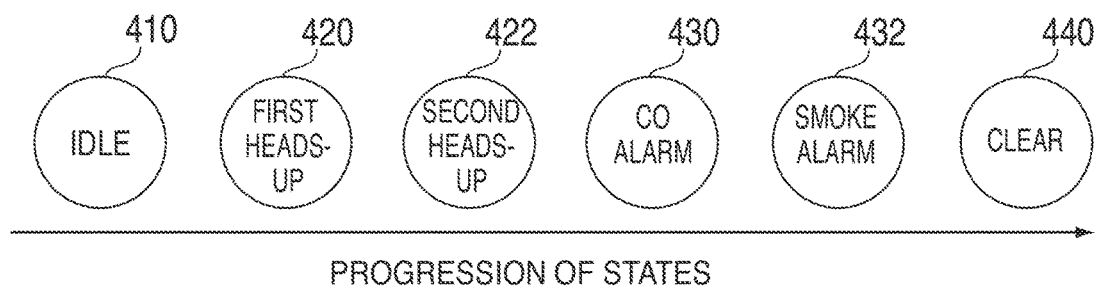
FIG. 4A shows an illustrative schematic of an alarm progression that may be implemented by a hazard detection system according to an embodiment.

FIG. 4A shows an illustrative schematic of an alarm progression that may be implemented by a hazard detection system according to an embodiment. As mentioned above, the hazard detection system may maintain at least two different state machines, one for smoke and another for CO. FIG. 4A graphically superimposes these two state machines on top of each other. The system may present different audible messages at different states according to embodiments discussed herein. The progression begins on the left side of the Figure with Idle state 410. During Idle state 410, the system is functioning and does not presently detect any elevated levels of CO or smoke. When the system detects elevated levels of CO and/or smoke, but such levels are still below alarm levels, the system may progress to first heads-up state 420 and/or second heads-up state 422. The system may progress to first heads-up state 420, for example, when CO levels exceed a first threshold. If the CO levels continue to rise, the system may continue to progress second heads-up state 422. The system may progress immediately to second heads-up state 422 if smoke levels exceed a first threshold. If the smoke and CO levels continue to rise above their respective alarm thresholds, the system may progress to CO alarm state 430 and/or smoke alarm state 432. When the smoke and CO levels fall below respective safe levels, the system may progress to an all-clear state 440.

It should be appreciated that the states shown in FIG. 4A are merely illustrative and that additional states may be added or states may be omitted. Moreover, it should be understood that that rules governing state changes are illustrative and that they may be different than that described above.

FIG. 4B shows an illustrative alarm priority list 450 that defines priorities of different smoke states and CO states for local and remote device, according to an embodiment. Alarm priority list 450 specifies which states take precedence over other states, and may serves as an arbiter for determining which spoken messages are played back over the speaker. List 450 includes priority column 460, conditional column 462, state column 464, device location column 468, and hush state column 470. Priority column 460 specifies the priority order of a particular condition (shown in column 462), state of that condition (shown in column 464), location of that condition (shown in column 468), and hush state of that condition (shown in column 470). For example, at row 480, a local smoke alarm that is unhusbable has a higher priority than a remote smoke alarm that is unhushable. The states in column 460 refer to different states that may exist in one or smoke state machines (e.g., smoke sensor state machine 314 and smoke system state machine 315) and different states that may exist in one or more CO state machines (e.g., CO sensor state machine 316 and CO system state machine 317). For example, the alarm state may represent a state where the alarm can be sounded, the HU1 and HU2 states may be pre-alarm states, the holding state may be temporary state where the state machine temporarily holds itself before transitioning to another state, the monitor state may be state where elevated levels of smoke or CO are detected, and the idle state may be a state where no elevated levels of smoke or CO are detected. The local and remote designations in column 468 indicate whether the state for a particular condition exists within a local device or a remote device (e.g., a device that can communicate its state information with the local device). The hush status in column 470 indicates whether the state for a particular condition and location has been hushed or is unhushable. The hush status of the state for a particular condition and location may be defined by conditions governing the operation of the smoke and CO state machines.

The different states of the hazard detection system may define markers by which the system audibly presents messages via the speaker. The hazard detection may utilize a speaking logic engine to determine the appropriate audible message to play. The speaking logic engine may evaluate several factors, including, for example, which state the system is in, how many systems in the structure are in the same state, and whether the room location of the system(s) in that state is known, to determine the appropriate message or messages to play. When multiple states simultaneously exist within a local device, among one or more remote devices, or a combination of local and remote devices, a priority engine may be accessed to determine which state takes priority over the others. For example, the priority engine may access priority list 450 of FIG. 4B to determine which state has priority. By using the priority and speaking logic engines, the message(s) played back may be designed to be concise, cognitive overload avoidant, compliant with UL: alarm and message requirements, and useful.

Figure 5:
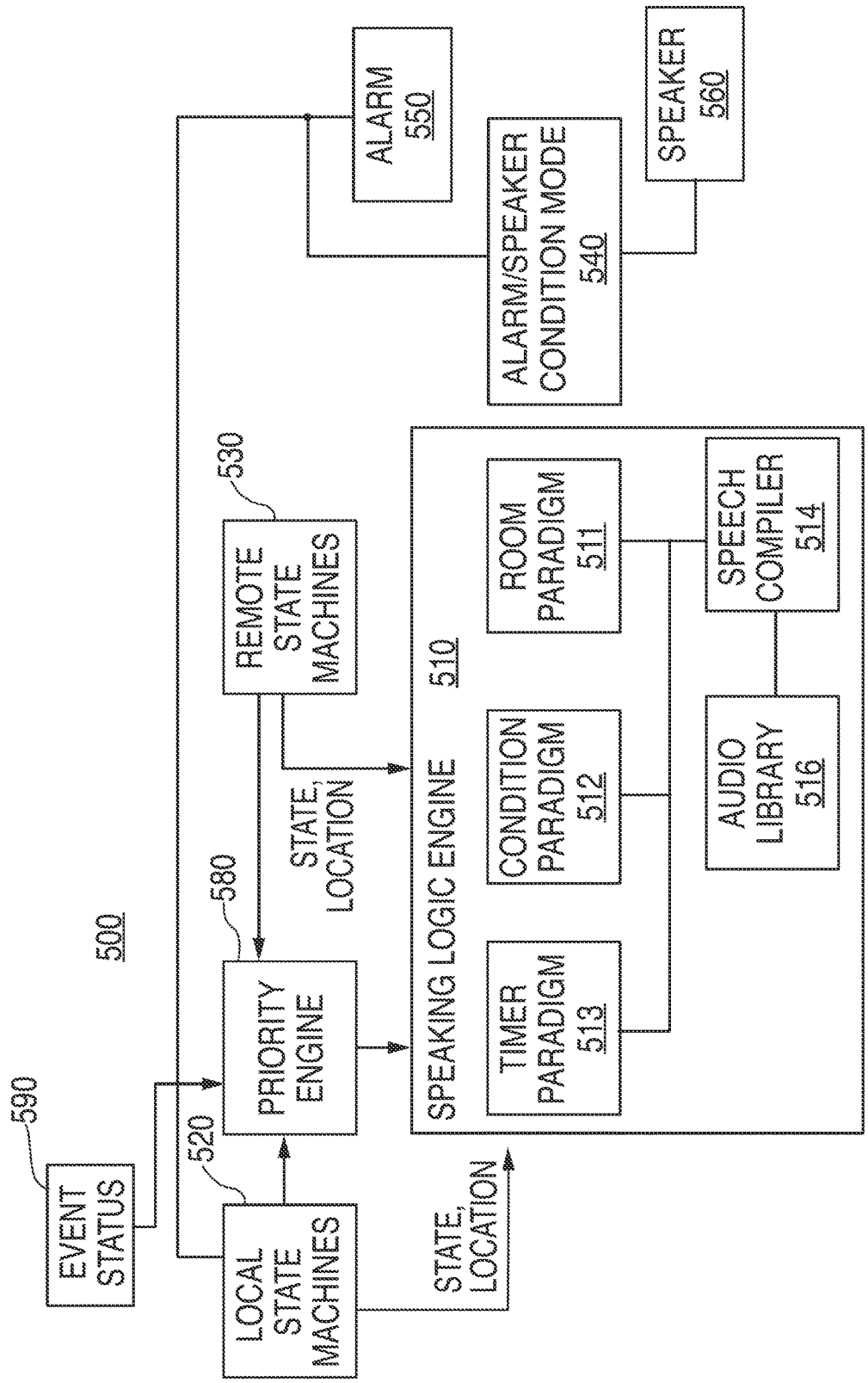
FIG. 5 shows an illustrative schematic diagram of hazard detection system including speaking logic engine, according to an embodiment.

FIG. 5 shows an illustrative schematic diagram of hazard detection system 500 including speaking logic engine 510 and priority engine 580 according to an embodiment. Components pertinent to use of speaking logic engine 510 are shown, but other components are omitted to avoid overcrowding the drawing. For example, FIG. 5 also shows local state machines 520, remote state machines 530, alarm speaker/coordination module 540, alarm 550, and speaker 560. Local state machines 520 may represent the state machines that are running locally on hazard system 500, and remote state machines may represent state machines running in systems remote to system 500, but are communicating with system 500. State machines 520 and remote state machines 530 may provide state information to engines 510 and 580, and if location information is available, they may also provide room identifying information to engine 510 and/or engine 580. For example, if system 500 enters into a smoke alarm state, local state machine 520 may inform speaking logic engine 510 that the system has entered into the smoke alarm state. The location identifier may also be provided to speaking logic engine 510 if the user has previously associated hazard system 500 with a particular room identifying designation. Continuing with the example, if one or more remote state machines 530 have entered into the smoke alarm state, they may communicate their state status to speaking logic engine 510 via a wireless communications link established among system 500 and the remote system. In addition, if location information is known for the one or more remote system, room identifying designations may also be provided.

Priority engine 580 may be operative to determine various priorities among different events that may be occurring within the hazard detection system or in one or more remote systems. The operation of any given hazard detection system may engage in any number of different events, and these events may be prioritized in order of importance. An illustrative list of such events, which may be embodied by event status 590, can include 0) battery near critical event, 1) alarm events, 2) factory reset event, 3) speak warnings event, 4) safety tests event, 5), boot/reboot event, 6) force update event, 7) ready event, 8) sound test event, 9) nightly reminder event, and 10) nightlight/pathlight event. For example, an alarm event may be more important than a safety test event. In addition, some events may include several sub-events that are also prioritized in order of importance. For example, one of the events may be an alarm event, which may include several different species of alarm events (e.g., as illustrated in FIG. 4B).

Priority engine 580 may receive event status 590, and state and location information from local state machines 520 and remote state machines 530, and based on the received information, priority engine 580 can determine which event takes priority and should be incorporated into the audible message being played back through the speaker. After making the determination, priority engine 580 can provide a priority determination to speaking logic engine 510.

Priority engine 580 can also function as an aggregator that aggregates the locations received from local and remote state machines 520 and 530. The aggregated locations can be passed to speaking logic engine. In one approach, the aggregating function can organize locations based on state. That is, if two or more locations are in a smoke alarm state, priority engine 580 can create a "smoke alarm state bucket" that includes two locations. If there is a third location in the smoke alarm state, then that bucket can be updated to include all three locations. If multiple locations contain multiple states, then priority engine 580 can create multiple buckets that contain location information. Based on the priority status of the states in the buckets, priority engine 580 may send information associated with the highest priority state to speaking logic engine 510. For example, if smoke and CO states exist in the same four locations, priority engine 580 may inform speaking logic engine 510 that smoke exist at those four locations. After a period of time passes, and the smoke condition dissipates, but the CO condition persists, priority engine 580 may inform speaking logic engine 510 that CO exist in those four locations.

Speaking logic engine 510 can compile the appropriate audio message for playback through speaker 560 based on information received from priority engine 580 and/or information received directly from local and remote state machines 520 and 530. Engine 510 may access one or more of event paradigm 582, room speech paradigm 511, condition speech paradigm 512, and timer paradigm 513 and instruct speech compiler 514 to retrieve the appropriate audio clips from audio library 516 for playback through speaker 560. Each of speech paradigms 511-513 and 582 can characterize the content of spoken information that is included in the audible message that is played back through the speaker. For example, room paradigm 511 may define how room information is conveyed in the audible message. Condition paradigm 512 may specify how alarm events are announced in the audible message. Time paradigm 513 may specify how time sensitive information is announced in the audible message. Event paradigm 582 may specify how information related to a particular event is announced in the audible message. Each paradigm may have a set of conditions that determine which speech paradigm is incorporated into the compiled message. The paradigm defines a framework of how content should be presented in the audio message and compiler 514 can populate the framework with the appropriate message. For example, using room paradigm 511, compiler 514 can insert the appropriate room information into the audible message so that occupants are made aware of which room(s) or how many rooms (having hazard detectors contained therein) are experiencing an event that merits a spoken message.

Audio library 516 may store several audio clips that may be retrieved for playback. The audio clips may be stored in a non-volatile memory such as nand flash. The audio clips may be updated over time, as desired. Speech compiler 514 may retrieve audio clips from library 516 and relay the clips to alarm/speaker coordination module 540. Compiler 514 may include a buffer to temporarily store audio clips.

FIG. 6A shows an illustrative set of rules 600 that define conditions for selecting a speech paradigm for logically presenting room information, according to an embodiment. FIG. 6A shows two columns, labeled Condition and Speech Paradigm. Each row specifies a particular condition and a speech paradigm. For example, condition 602 indicates that when n, which is the number of hazard systems experiencing a condition, is equal to 1 and the location (e.g., room location) of that hazard system is known, speech paradigm 604 is used. Speech paradigm 604 includes speech framework [in "x" ], where the brackets define the framework of the speech to be incorporated into an audible message, and the "x" represents a particular room to be spoken. For example, if smoke exist in the living room (i.e., the "x"), and conditions of condition 602 are met, the audible message may include "in the living room."

Condition 612 indicates that when n is equal to 1 and the location is unknown, speech paradigm 614 is used. Speech paradigm 614 includes speech framework [in 1 room]. For example, if smoke exists in one room, but the location is not known, the audible message can include "in 1 room." Condition 612 indicates that when n is equal to 2 and the location of both rooms is known, speech paradigm 624 is used. Speech paradigm 624 includes speech framework [in "x" and in "y"], where "y" represents a second room. For example, if smoke exists in the bedroom and the kitchen, the audible message may include "in the bedroom and in the kitchen." Condition 632 indicates that when n is equal to 2 and at least one location is unknown, speech paradigm 634 is used. Speech paradigm 634 includes speech framework [in 2 rooms]. For example, if smoke exist in the bedroom and kitchen, but the location of the kitchen is not known, the audible message include "in 2 rooms." Condition 642 indicates that when n is between 2 and 10, speech paradigm 644 is used. It should be understood that integers 2 and 10 are merely illustrative and that other numbers may be used in their place. Speech paradigm 644 includes speech framework [in n rooms]. For example, if smoke exists in five rooms, the audible message can include "in 5 rooms." Condition 652 indicates that when n is greater than 10, speech paradigm 654 is used. Speech paradigm 614 includes speech framework [in many rooms]. For example, if smoke exist in eleven rooms, the audible message can include "in many room."

The speech content of paradigms 604 and 624 may represent detailed recitation of conditions existing within a structure. That is, these paradigms specifically identify which room or rooms contained hazard systems that detect conditions that merit alert. The speech content of paradigms 614, 634, 644, and 654 may represent a summarization of conditions detected in the structure. That is, these paradigms summarize how many rooms contain hazard systems that detect conditions that merit alert.

It should be appreciated that the conditions and speech paradigms are merely illustrative and that other conditions and paradigms may be used. For example, if n is three and their locations are all known, the speech paradigm may recite all three rooms.

FIG. 6B shows an illustrative set of rules 660 that define conditions for selecting a speech paradigm for logically presenting condition information, according to an embodiment. FIG. 6B shows two columns, labeled Alarm Condition and Speech Paradigm. Each row specifies a particular condition and a speech paradigm. The listed conditions and speech paradigm for each condition are self-explanatory. For example, if the alarm condition is only smoke, then the compiler may be instructed to state "smoke". It should be appreciated that the conditions and speech paradigms are merely illustrative and that other conditions and paradigms may be used.

Figures 6C, 7:
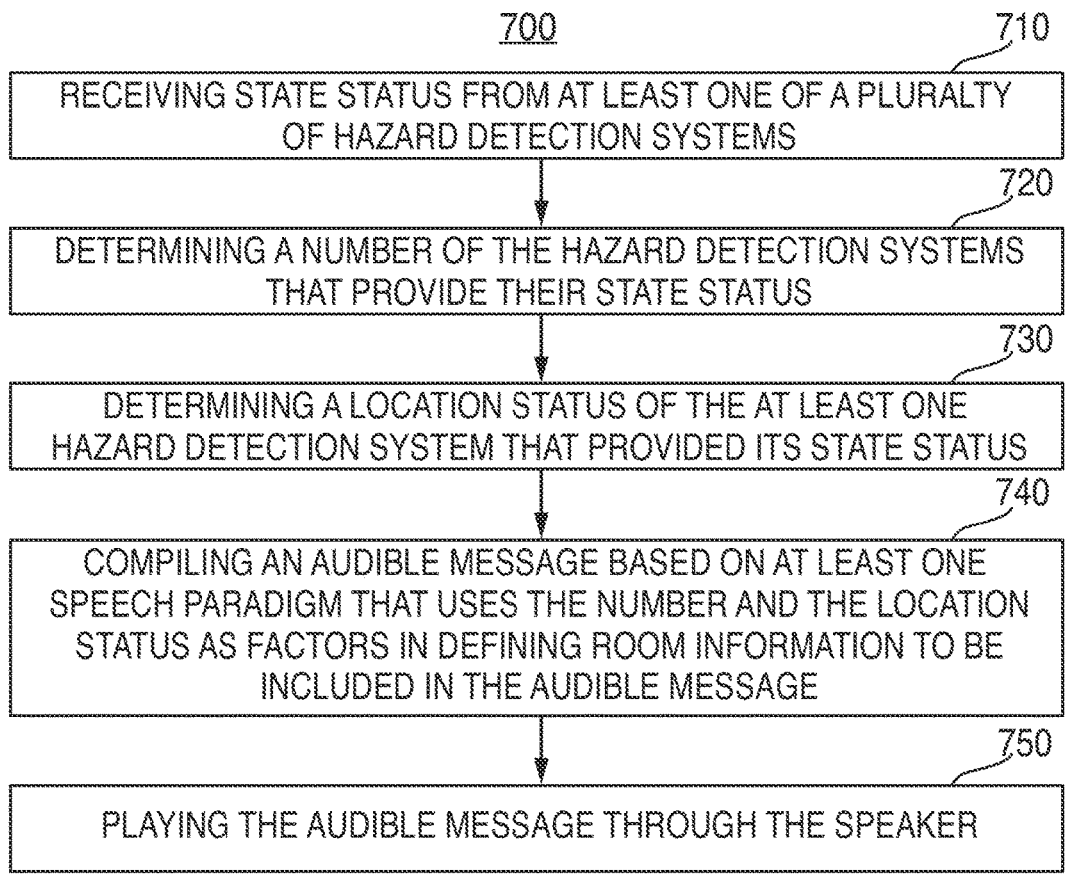

FIG. 6C shows an illustrative set of rules 670 that define conditions for selecting a speech paradigm for logically presenting time information, according to an embodiment. FIG. 6C shows two columns, labeled Time Condition and Speech Paradigm. Each row specifies a particular condition and a speech paradigm. The listed conditions and speech paradigm for each condition are self-explanatory. For example, if the time condition falls within one month and one week, the compiler may be instructed to state "in four weeks". Alternatively, the compiler may be instructed to state "in one month". It should be appreciated that the conditions and speech paradigms are merely illustrative and that other conditions and paradigms may be used.

FIG. 7 shows an illustrative process 700 for incorporating room speaking logic into an audible message played back through a speaker of a first hazard detection system, according to an embodiment. The first hazard detection system can be one of several hazard detection systems that exist within a structure. At step 710, state status can be received from at least one of the plurality of hazard detection systems. For example, the state status can be provided by state machines operating locally within the system (e.g., local state machines 520) and by systems that are remote to the system (e.g., remote state machines 530).

At step 720, a number of the hazard detection systems that provided their state status can be determined. In one approach, the number may be associated with systems experiencing the same state (e.g., smoke or CO). In another approach, the number may be associated with system that are presently operating in an state the merits an alert. At step 730, a location status of the at least one hazard detection system that provided its state status can be determined. For example, if the user has previously associated a particular hazard system with a room name, then that location is known.

At step 740, an audible message can be compiled based on a set of rules that uses the number and the location status as factors in defining room information to be included in the audible message. For example, speaking logic engine 510 may be utilized to ascertain the appropriate speech paradigm to use based on the number of systems and known location of those systems. At step 750, the audible message can played back through the speaker.

It should be appreciated that the steps shown in FIG. 7 are merely illustrative and that additional steps may be added or omitted, or that the order of the steps may be rearranged. For example, a step for incorporating additional text into the audible message may be added. As a specific example, the additional text can be based on the received state status. If the received state status indicated presence of smoke, the message can include the word "smoke" in the audible message (e.g., "There's [smoke] [in the bedroom]." In fact, the state status may be part of an alarm status speech paradigm that can be leveraged by speaking logic engine 510 to intelligently insert the appropriate alarm type into the audible message.

Figure 8A:
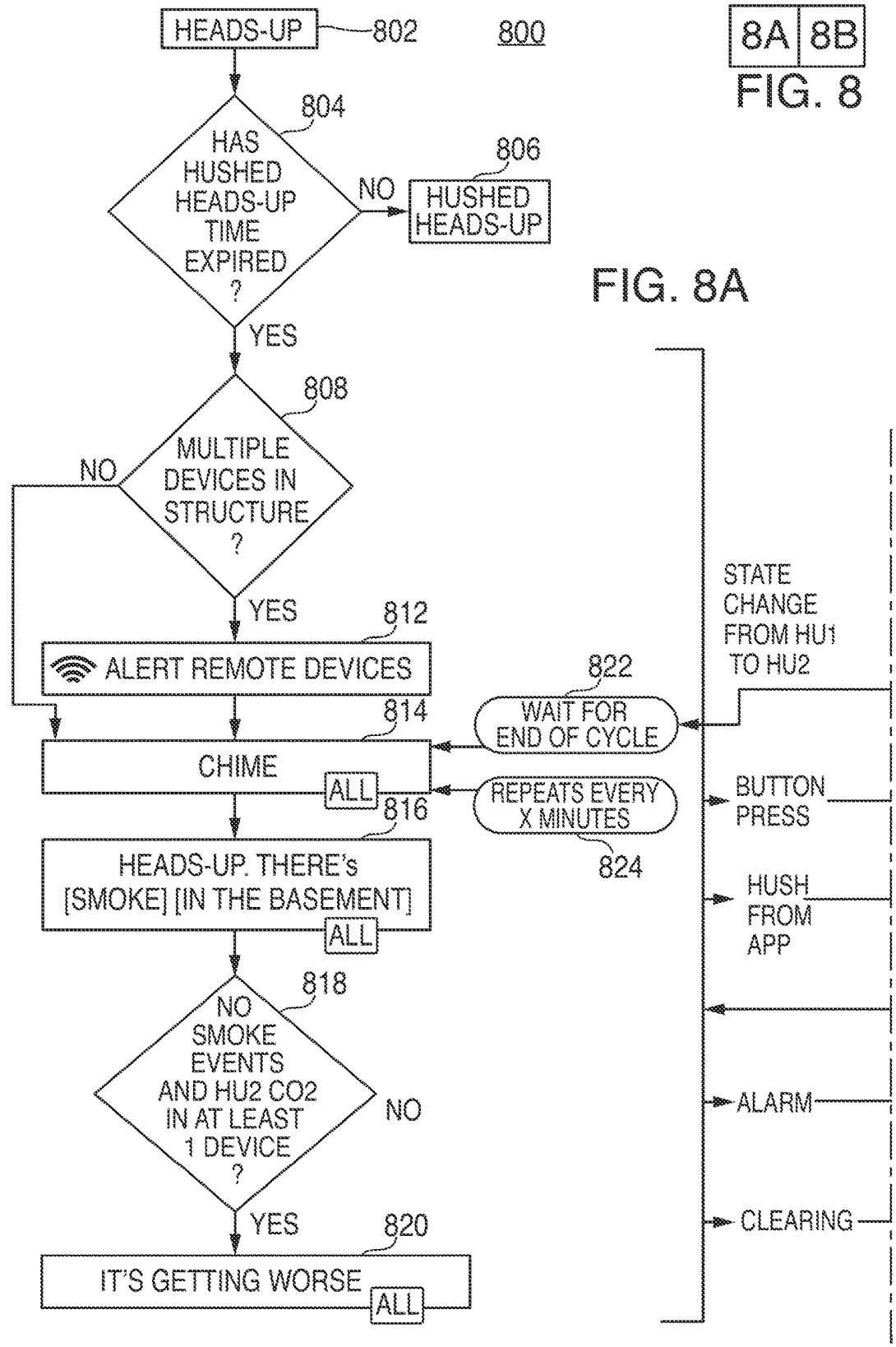
FIGS. 8A and 8B show an illustrative heads-up process during which different audible messages may be played back, according to an embodiment.
Figure 8B:
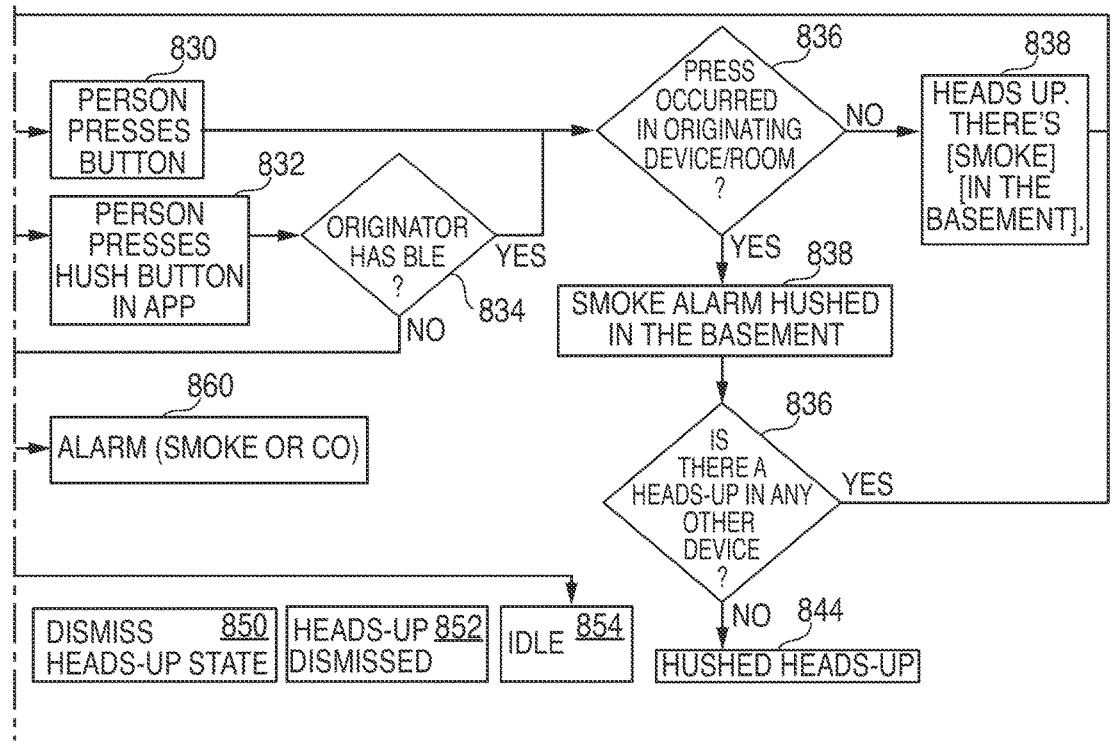

The manner in which audible messages are played back may differ depending on whether the hazard system is in a heads-up state, alarm state, or clear state. In the heads-up and clear states, there is no loud sounding alarm, and as such, there may be no need to coordinate the playback of speech in conjunction with the loud sounding alarm. In the alarm state, there is a loud sounding alarm, and any speech may need to be coordinated with the alarm in order to avoid any overlap. Reference is now made to FIG. 8, which shows illustrative heads-up process 800 during which different audible messages may be played back, according to an embodiment.

Starting at step 802, process 800 may be in a heads-up state. At step 804, a determination is made whether a hushed heads up has expired. The heads-up may have been previously hushed at step 830 or step 832. If hushed, a timer may be started that delays announcement of any subsequent speaker messages until it expires or a there is state change (e.g., a state change from heads-up 1—HU1-to heads-up 2—HU2). If the determination at step 804 is NO, process 800 may resume its status as hushed heads-up at step 806. If the determination is YES, process 800 may proceed to step 808, where a determination of whether multiple devices in a structure exist. If the determination step 810 is YES, the remote systems may be alerted (at step 812) of the system's change to a heads-up state. If NO, process 800 may proceed to step 814.

At step 814, the speaker in the system may emit a chime sound to alert occupants that a message is about to played back. At step 816, an audible message is played back. This audible message may incorporate the alarm paradigm and room paradigm, as discussed above to inform the occupants of the present alarm status. For example, the audile message may speak "Heads-Up. There's [smoke] [in the basement]." Alternatively, if there is a Heads-Up 1 event and in one room, the message may state ""Heads-Up. There's [carbon monoxide] [in the basement]." Additionally, if there is a Heads-Up 1 event and in two rooms, the message may state ""Heads-Up. There's [carbon monoxide] [in the basement and in the kitchen]."

At step 818, a determination is made whether no smoke events exist and at least one heads-up 2 event exist in the systems within the structure. If the determination is YES, a message stating that "It's getting worse" may be played back and the process may revert to hold step 824, where the spoken message is repeated every x minutes. If the determination is NO, process 800 may proceed to step 824.

If the user attempts to hush the heads-up, he or she may press a button on the system at step 830 or press a button on an application at step 832. If the button is pressed at step 830, process proceeds to step 836, which determines if the button press is implemented on the originating system. If the determination at step 836 is YES, a message stating "[Smoke alarm hushed [in the basement]" (as step 840). If the determination at step 836 is NO, the heads-up message may be repeated and process 800 may proceed to step 822, which defines a wait cycle before another message is spoken. After step 840, a determination is made whether any other devices are experiencing a Heads-up event, at step 842. If YES, process 800 may proceed to step 822. If NO, process 800 may change the heads-up state to a hushed heads-up state, at step 844.

If a user pressed a button on an application (on a mobile) at step 822, a determination may be made as to whether that mobile device can communicate with the originating system (of the alarm) at step 834. If YES, process 800 proceeds to step 836. If NO, process 800 ignores the command.

If the hazard system progress to an alarm state such as CO alarm state or Smoke alarm state, process 800 may proceed to step 860. If the system progresses to a clear state, process 800 may proceed to steps 850 (where the system ignores the heads-up state), 852 (where an application on a mobile device ignores the heads-up), and 854 (where the system returns to an Idle state). If desired, the system may speak a message indicating the everything is all clear.

In the alarm state, there is a loud sounding alarm, and any speech may need to be coordinated with the alarm in order to avoid any overlap. The smoke alarm and CO alarm may sound their loud buzzer sounds according to their respective predefined schedules. These schedules may be defined by Underwriter Laboratories (UL). Embodiments described herein show how spoken text is logically integrated to the alarming sequence for smoke and CO alarms.

Figure 9A:
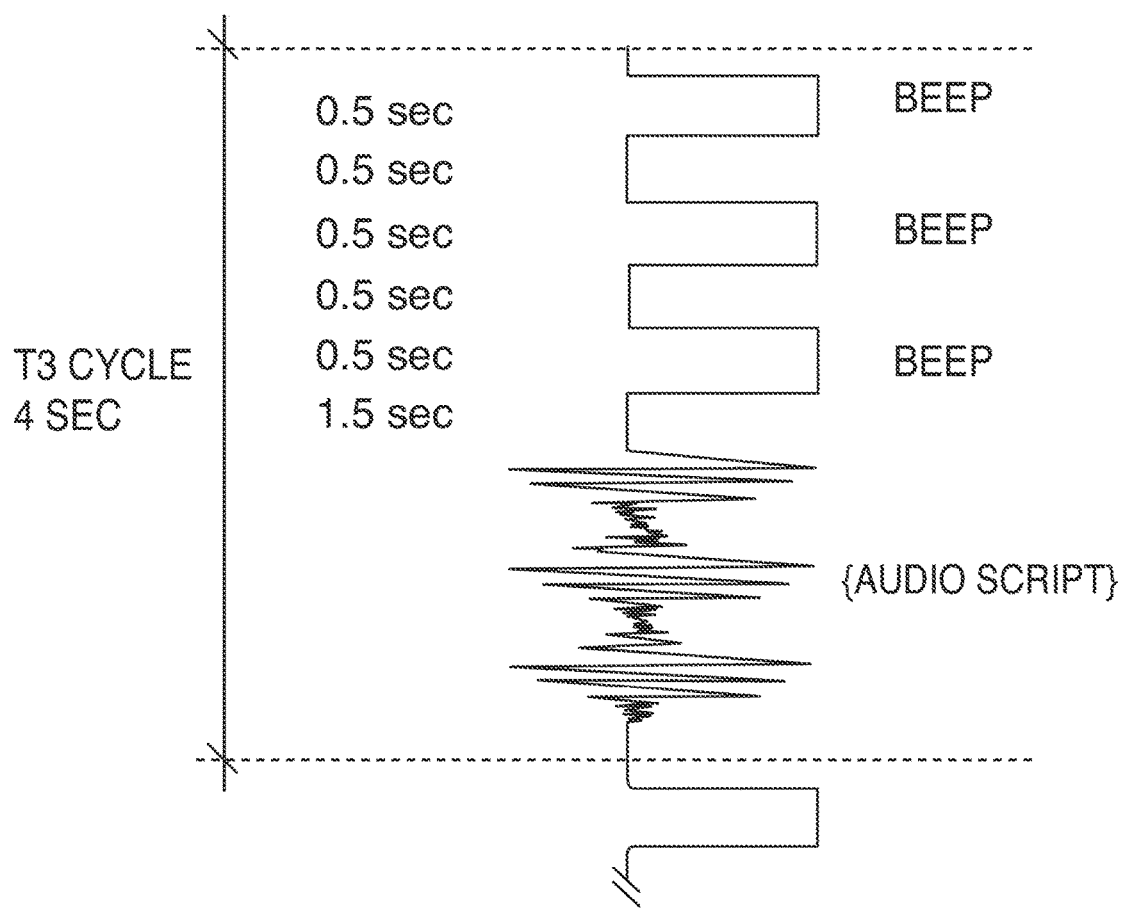
FIGS. 9A and 9B show illustrative smoke beep patterns with integrated spoken text, according to various embodiments.
Figure 9B:
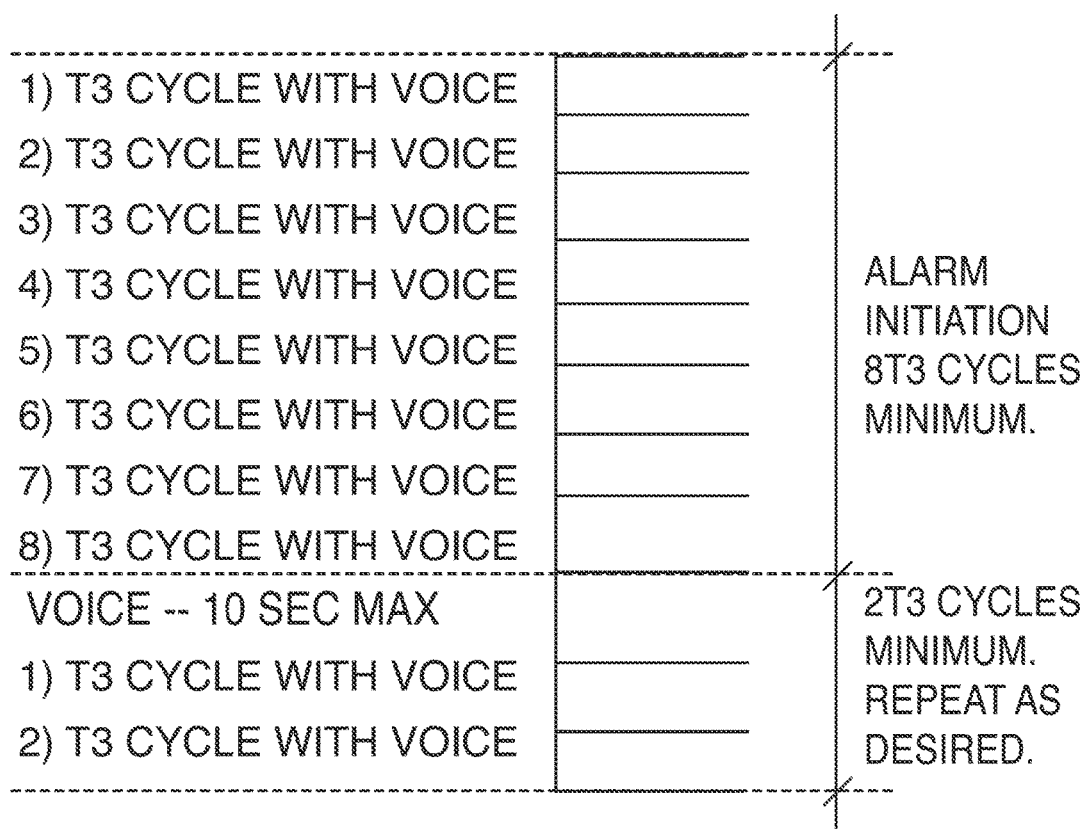

FIGS. 9A and 9B show illustrative smoke beep patterns with integrated spoken text, according to various embodiments. FIG. 9A illustrates a T3 smoke alarm cycle. The T3 smoke alarm cycle may have a period of approximately four (4) seconds. The T3 smoke alarm cycle may include three beeps, each lasting for approximately one half second and spaced apart by one half second intervals. A speech interval of approximately one and a half seconds can exist after completion of the third beep. Thus, the alarm beeps three times, waits for 1.5 seconds and then begins another T3 bee cycle. It is during this speech interval that an audio script can be played back through the speaker.

FIG. 9B shows an alarm initiation sequence, as defined by UL. During the first instance of the sounding of the smoke alarm, a minimum of eight (8) T3 cycles must be performed. Following the end of the eighth T3 cycle, a maximum time period (e.g., 10 seconds) may elapse before a minimum of two T3 cycles are repeated as desired. In addition to the speech durations that exist within each T3 cycle, an audio message may be played back through the speaker during this maximum time period.

FIGS. 10A-10D show different integrated speech and alarm beeps according to various embodiments. In particular, FIGS. 10A-10C show different speech integration examples that can be performed during the speech periods of four T3 alarm cycles. Note that the bracketed items (e.g., [ ]) can represent the different paradigms that can be selected based on various parameters as discussed above. For example, referring specifically to FIG. 10A, the word "emergency" is played backed during the first T3 cycle, "There's [smoke]" being played back during the second T3 cycle. [Smoke] may be selected based on a condition paradigm. "In the bedroom" may be played back during the third T3 cycle. Again, [in the bedroom] may be selected based on a room paradigm. Lastly, "press to hush" may be played back during the fourth T3 cycle.

FIG. 10D shows an example of alarm integrated speech that may be played back during an alarm initiation. As specified in FIG. 9B, alarm initiation includes 8 T3 cycles, followed by a break, and then at last 2 T3 cycles. Thus, FIG. 10D shows a first four cycle sequence (1010), followed by a second four cycle sequence (1020), which is followed by first long message during the max period (1030), which is followed by at third four cycle sequence (1040), and which is followed by second long message during the max period 1050. Although only two T3 cycles are required after the long message, four T3 cycles are used to keep consistent with the earlier messages. The third cycle sequence 1040 and the second long message 1050 may repeat indefinitely until notified to cease.

Figure 11A:
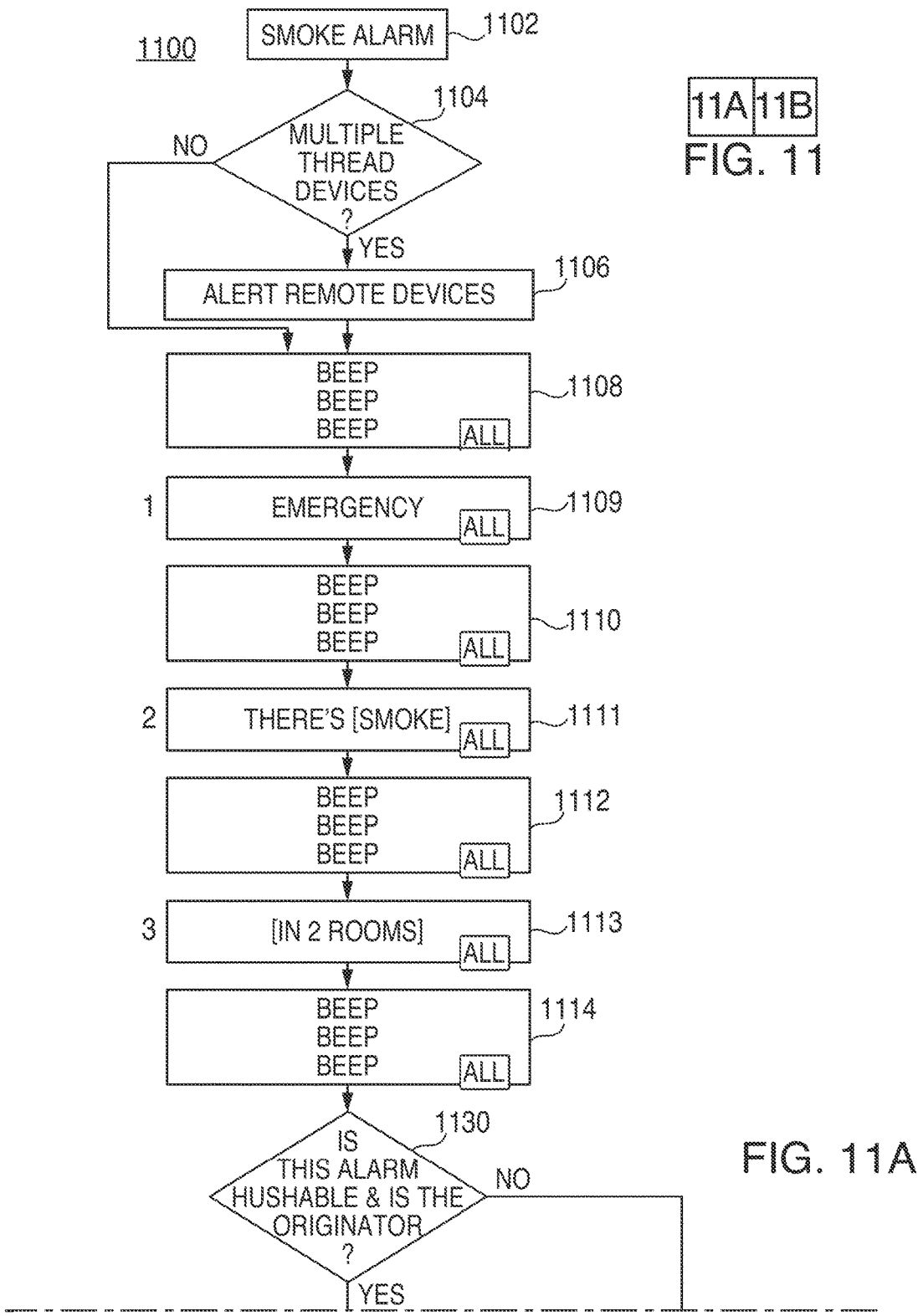
FIGS. 11A and 11B show an illustrative process for coordinating speech with a smoke alarm according to an embodiment.
Figure 11B:
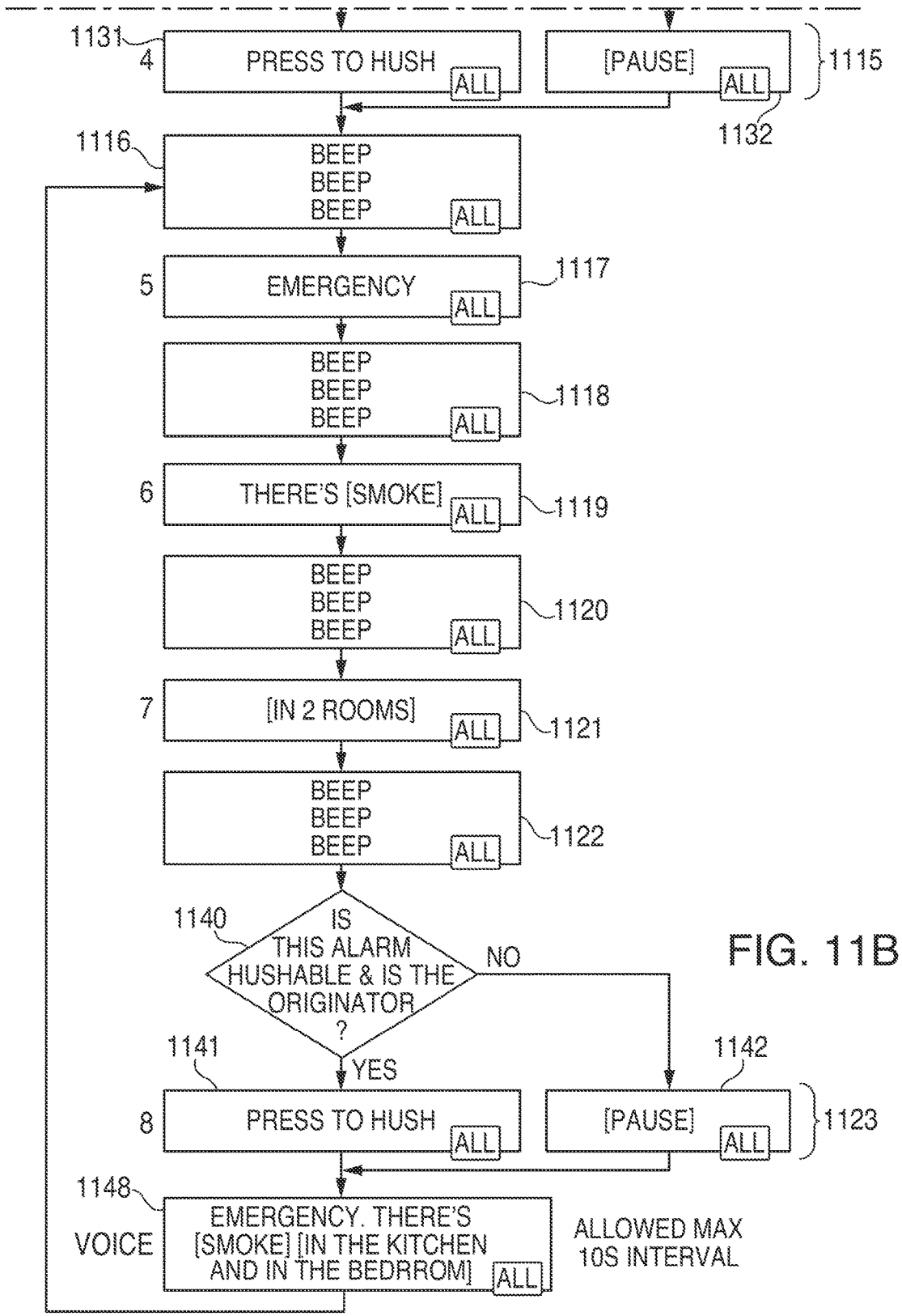

FIG. 11 shows an illustrative process 1100 for coordinating speech with a smoke alarm according to an embodiment. Starting at step 1102, a hazard system is in a smoke alarm state. At step 1104, a determination is made whether other systems in a structure exist. If YES, those other systems are alerted to the state change to the smoke alarm state, at step 1106. IF NO, the process proceeds to step 1108, which marks the start of a smoke alarm initiation. As explained above, the smoke alarm initiation includes eight successive T3 cycles as illustrated in steps 1108-1123. In particular, steps 1108, 1110, 1112, 1114, 1116, 1118, 1120, and 1120 represent the BEEP BEEP BEEP alarm pattern being emitted by an alarm, and steps 1109, 1111, 1113, 1115, 1117, 1119, 1121, 1123 represent time frames during which speech is emitted by a speaker. It should be appreciated that any one or more of the speech steps 1109, 1111, 1113, 1115, 1117, 1119, 1121, 1123 can incorporate the condition and room paradigms as discussed above.

At step 1130, a determination is made as to whether the alarm is hushable and the originator of the alarm. If NO, no speech is spoken at step 1115/1132. If YES, a message may be spoken at step 1131/1115. A similar determination may be made again at step 1140. If the determination at step 1140 is YES, no message is spoken at step 1142/1123 and if NO, a message may be spoken at step 1141/1123.

After the alarm initiation is complete at step 1123, a voice message may be played back at step 1148. After step 123, the system may have a temporarily reprieve from having to sound any alarm sounds for a period of time that exceeds speech time period in each T3 cycle. During this time, a longer audile message can be played back at step 1148. The message played back at step 1148 may use the condition and room paradigms to compile a relatively detailed message. After step 1148, process 1100 may return to step 1116 to repeat the four cycle T3 sequence (at steps 1116-1123), followed by a long message during a max speech period at step 1148.

It should be appreciated that the spoken text in steps 1109, 1111, 1113, 1115, 1117, 1119, 1121, 1123, and 1148 is merely illustrative and that any suitable text may be spoken during these time frames. Moreover, it should also be appreciated that additional steps may be added or omitted, as desired. For example, a sequence of additional steps may be added to handle a user's attempt to hush an alarm, similar to that discussed in connection with FIG. 8. Depending on the hushability status and the status of other systems within the structure, different spoken messages may be provided. These spoken messages may include the condition and room paradigms to compile messages that concisely inform occupants of the conditions in the structure.

Figure 12A:
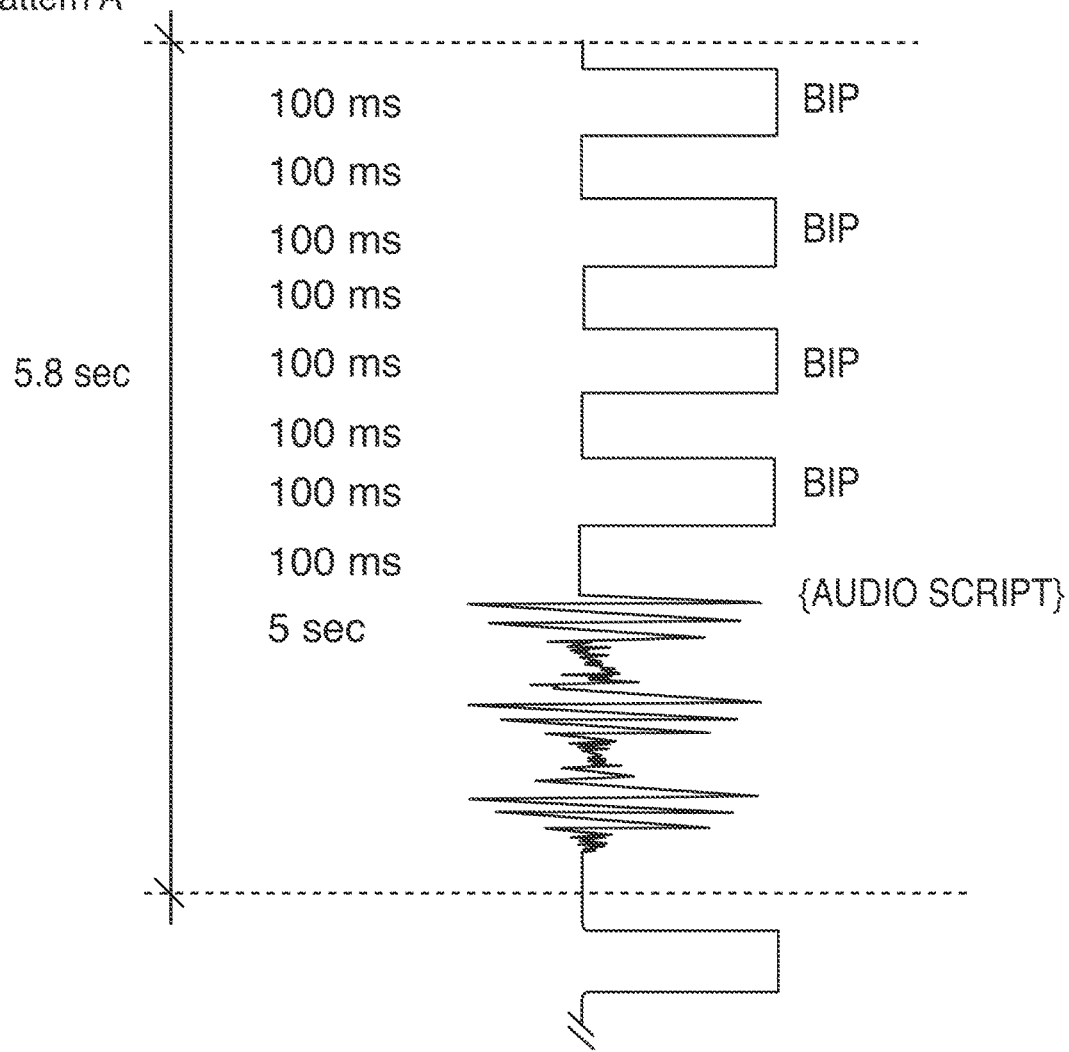
FIGS. 12A and 12B show illustrative CO bip patterns with integrated spoken text, according to various embodiments.
Figure 12B:
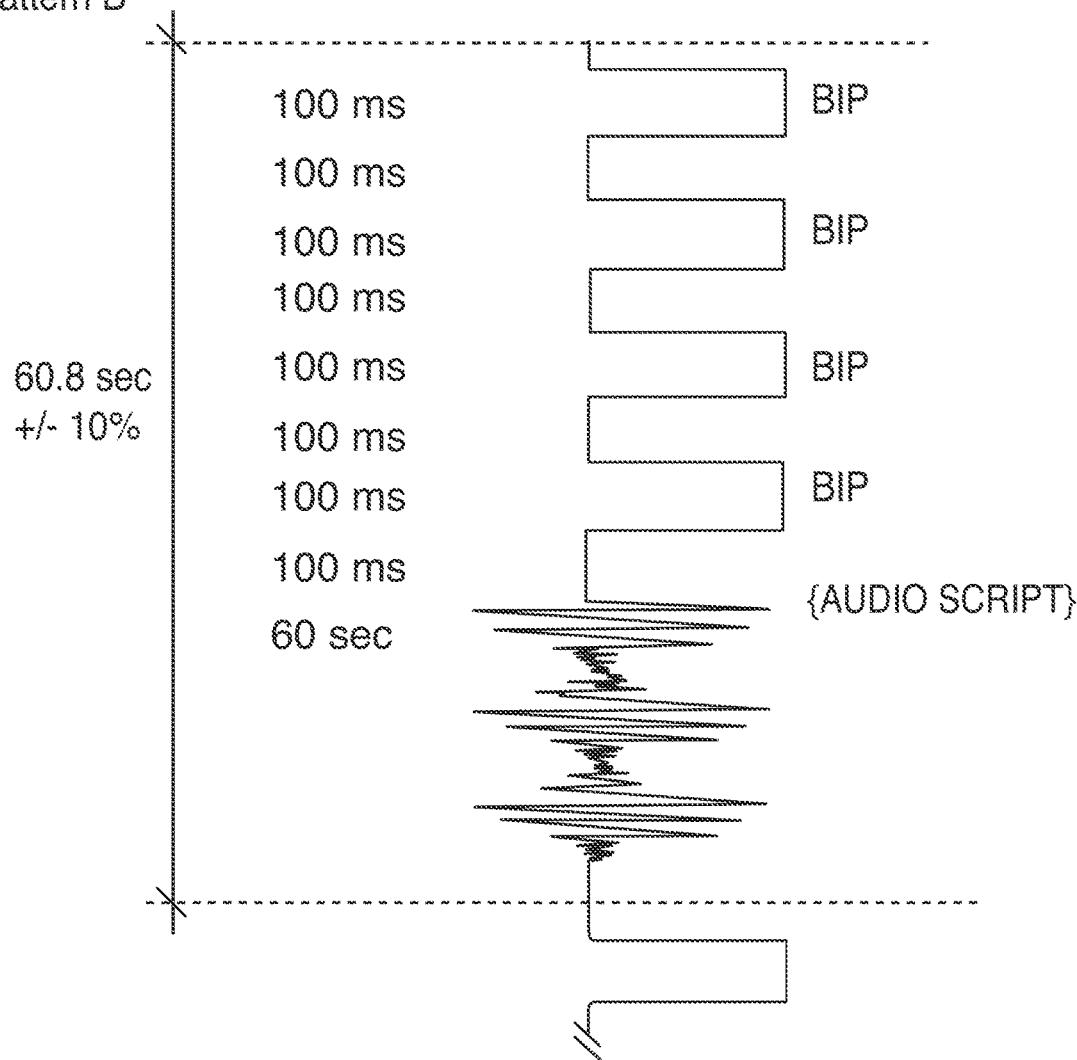

FIGS. 12A and 12B show illustrative CO bip patterns with integrated spoken text, according to various embodiments. FIG. 12A illustrates a first CO bip sequence the occurs during the first four minutes of CO alarm. In this sequence, four bips are followed by a speech period of five (5) seconds. Thus, the CO alarm bips four times, waits for 5 seconds and then begins another cycle. It is during this 5 second speech interval that an audio script can be played back through the speaker.

FIG. 12B illustrates a second CO bip sequence the occurs after the first four minutes of CO alarm has passed. In this sequence, four bips are followed by a speech period of sixty (60) seconds. Thus, the CO alarm bips four times, waits for 60 seconds and then begins another cycle. It is during this 60 second speech interval that an audio script can be played back through the speaker.

FIGS. 13A-13C show different integrated speech and CO alarm bips according to various embodiments. In particular, FIGS. 10A and 10B show different speech integration examples that take place during the first four minutes and FIG. 10C shows a speech integration example that occurs after the first four minutes. As shown in FIGS. 10A and 10B, the spoken messages can be summarized messages that do not specifically call out specific names of rooms. Whereas in FIG. 10C, detailed information on room locations are provided (e.g., because 60 seconds are available to playback a message).

Figure 14A:
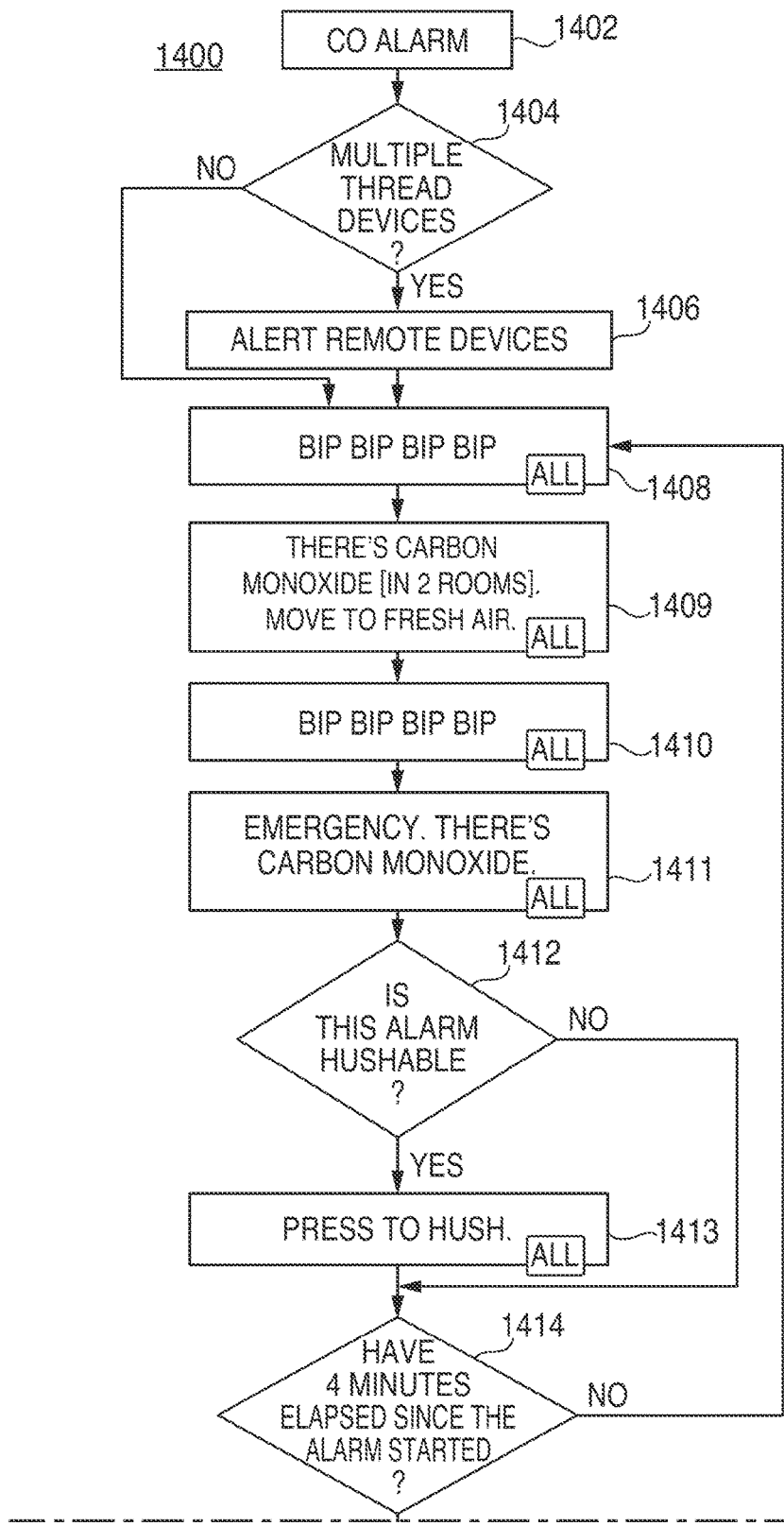
FIGS. 14A and 14B show an illustrative process for coordinating speech with a CO alarm, according to an embodiment.
Figure 14B:
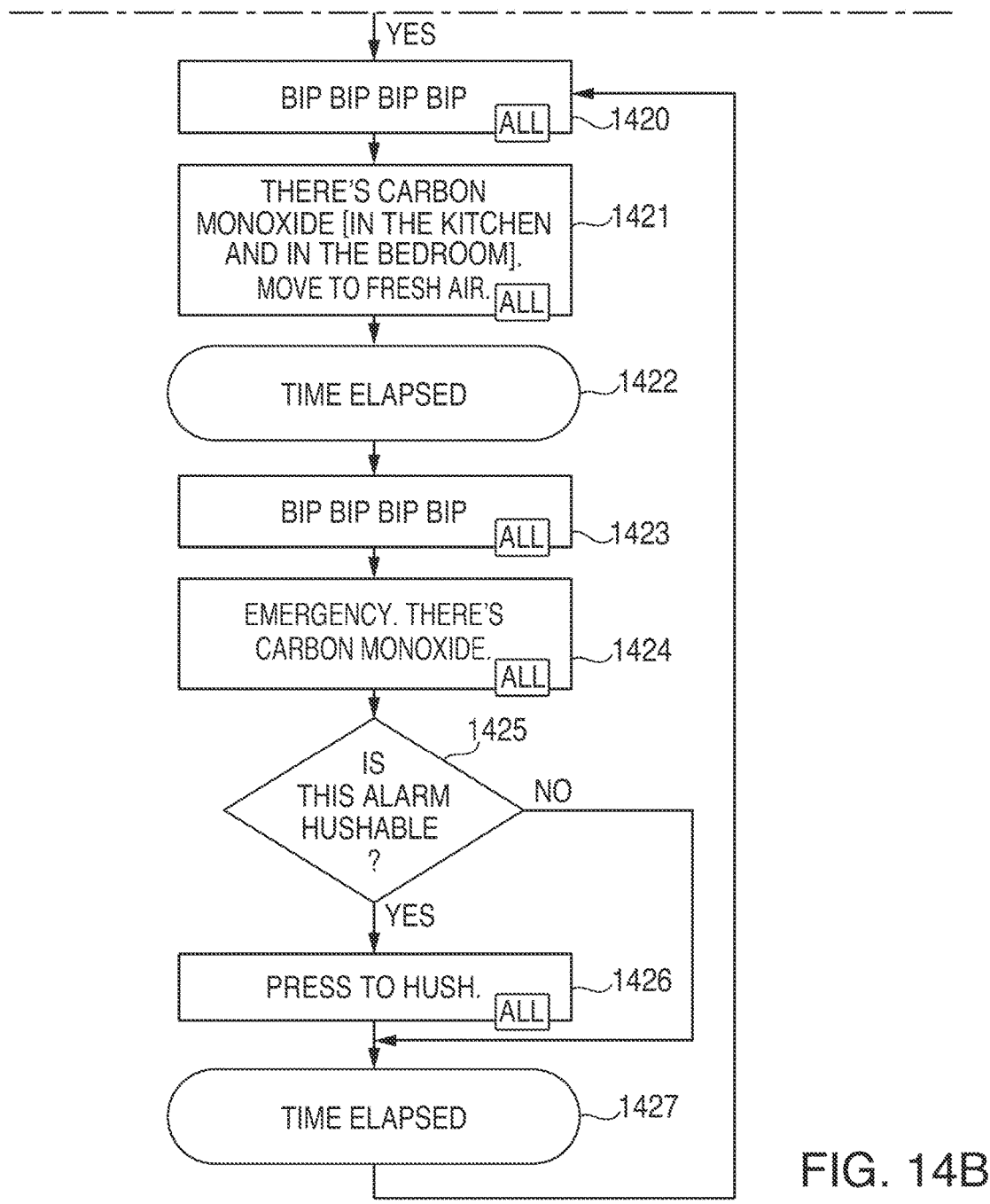

FIG. 14 shows an illustrative process 1400 for coordinating speech with a CO alarm according to an embodiment. Starting at step 1402, a hazard system is in a CO alarm state. At step 1404, a determination is made whether other systems in a structure exist. If YES, those other systems are alerted to the state change to the CO alarm state, at step 1406. IF NO, the process proceeds to step 1408, which marks the start of the CO smoke alarm according to a first pattern (e.g., pattern where bibs are followed by five seconds of no bibs). During steps 1408-1411, the system alternates between sound alarm bips at steps 1408 and 1410, and playing back spoken messages at steps 1409 and 1411. The messages played back at steps 1409 and 1411 may incorporate condition and room paradigms to provide specific information associated with the alarm.

At step 1412, a determination is made as to whether the alarm is hushable. If NO, process 1400 proceeds to step 1414. If YES, the system may announce a press-to-hush message after one of the bib bib bib bib alarm sequences, at step 1413. At step 1414, a determination is made whether four minutes have elapsed since the CO alarm started. If NO, process 1400 returns to step 1408. If YES, process 1400 proceeds to step 1420.

Step 1420 marks the start of sounding the CO alarm according to a second pattern (e.g., a sequence of bibs followed by a sixty second period of no bibs). The bibs may be sounded at step 1420, and at the end of the bibs, a message can be played back at step 1422. The message may contain relatively more information than the messages played back at steps 1409 and 1411 because the non-bib window is larger during the alarming sequence after four minutes have elapsed. In addition, the message played back at step 1421 can include condition and room paradigms. After the non-bib window expires at step 1422, the bibs may be sounded again at step 1423, followed by message playback at step 1424.

At step 1425, a determination as to whether the alarm can be hushed is made. If NO, process 1400 proceeds step 1427. If YES, process 1400 proceeds to step 1426, where a message informing occupants that the alarm can be hushed can be provided. After time elapses at step 1426, the process may return to step 1420.

It should be appreciated that the spoken text in steps 1409, 1411, 1421, and 1424 is merely illustrative and that any suitable text may be spoken during these time frames. Moreover, it should also be appreciated that additional steps may be added or omitted, as desired. For example, a sequence of additional steps may be added to handle a user's attempt to hush an alarm, similar to that discussed in connection with FIG. 8. Depending on the hushability status and the status of other systems within the structure, different spoken messages may be provided. These spoken messages may include the condition and room paradigms to compile messages that concisely inform occupants of the conditions in the structure.

When the system progresses to a clear state, it may leverage the condition and room paradigms to provide a message that identifies the alarm is over. For example, the compiler may produce a message that states "The [smoke] alarm is over." The [smoke] may be swapped out with [carbon monoxide] depending on the condition paradigm.

The speech logic for specifying particular rooms or the number of rooms experiencing some sort of issue may be used in in a non-alarm context. For example, each of the systems may conduct a number of self-tests to evaluate the operation of several components. If any of these components are not operating according to defined specifications, one or more audible messages may be compiled and presented to alert occupants of the structure. In addition, the audible messages may update the occupants on the progress status of the self-tests and inform the occupants that "the test has been completed in [z] rooms," where [z] is obtained by the room paradigm, and may indicate which hazard systems (identified by room name using the room paradigm) did not perform or complete their self-tests.

If multiple non-alarm events are monitored, the system may intelligently avoid overloading a user's cognitive load by providing the information piecemeal in response to active user interaction (e.g., button press or press of a button on an application). For example, a "heads-up" announcement may be made to inform occupants that [n] rooms or [many] rooms require attention and can request the user to press a button to hear more information. When the user presses the button to hear more information, and multiple issues exists, a fixed number of issues may be prioritized (e.g., three highest priority issues) and announced via the speaker.

Figure 15B:
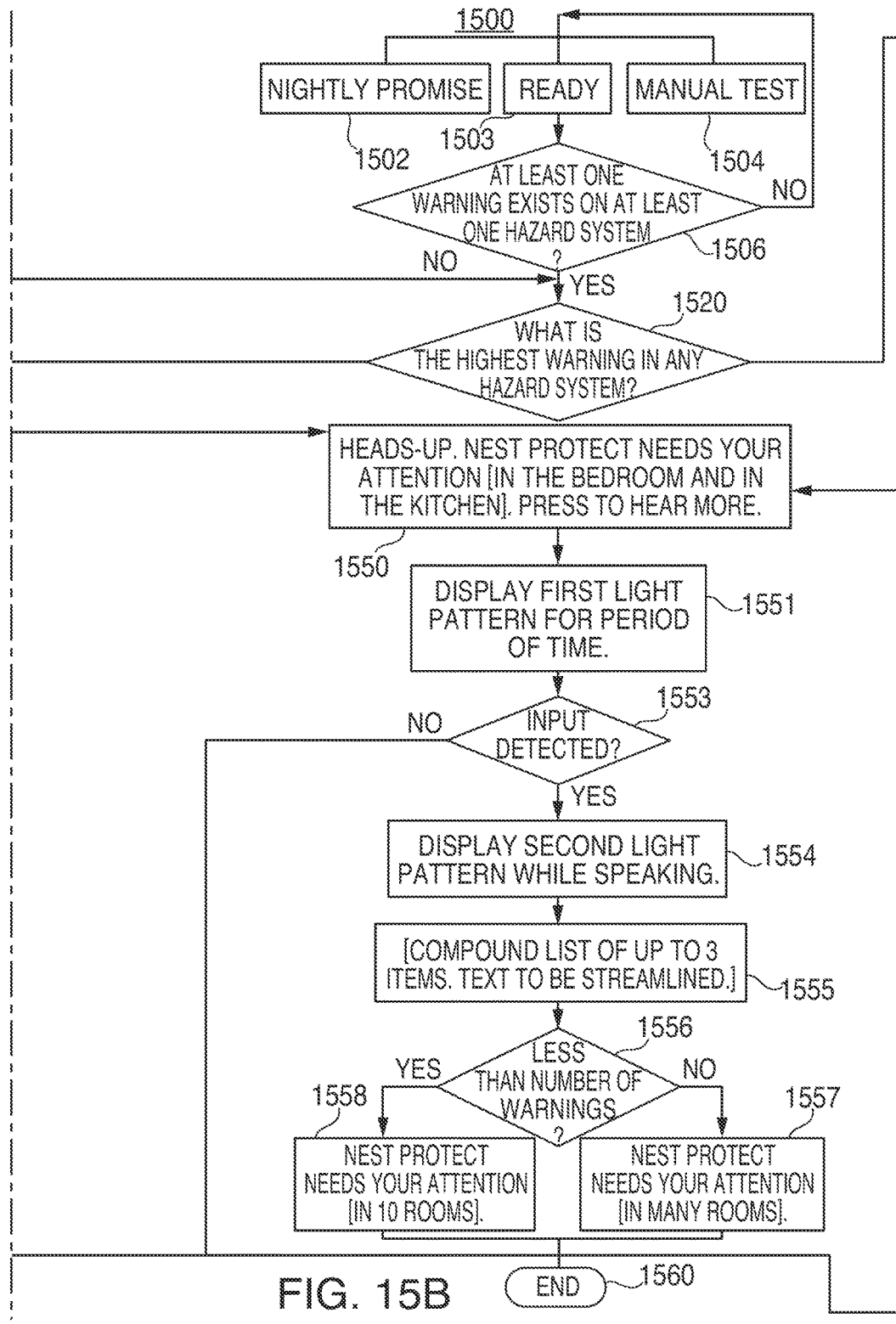

FIG. 15 shows illustrative process 1500 for providing audible messages for various non-alarm events, according to an embodiment. In response to entering into any one of a nightly promise state (step 1502), ready state (step 1503), and manual test state (step 1504), process 1500 may check whether at least one warning event exists on at least one hazard system within a structure (at step 1506). If the determination is NO, process 1500 may loop back to the start of process 1500. If YES, process 1500 proceeds to step 1520, which determines whether any warning event qualifies as a safety critical event. If there are no safety critical events, process 1500 advances to step 1521.

At step 1521, a determination is made if there are two or more different warnings. If the determination is YES, process 1500 may proceed to step 1550, which is discussed in more detail below. If the determination is NO, process 1500 proceeds to step 1522, which determines whether the non-critical warning is expected to become an issue within a fixed time period. For example, the time period may be one of the conditions set forth in the timer paradigm of the speaking logic engine 510. If the determination is YES, a message may be compiled that includes the room and timer paradigms, as illustrated in step 1523. If the determination is NO, process 1500 may proceed to step 1524.

At step 1524, a determination is made whether a battery is low. For example, a battery may be considered low if it has a projected estimated life between 2 week and 6 months. If the determination at step 1524 is YES, a message indicating that the battery is low in a room defined by the room paradigm may be announced as step 1527. If the determination at step 1524 is NO, process 1500 may proceed to step 1528.

At step 1526, a determination is made whether a device has disconnected from the Internet (after having been previously connected). If YES, a message indicating that the device is disconnected from the Internet in a room defined by the room paradigm may be announced at step 1527. If NO, process 1500 may proceed to step 1530.

At step 1528, a determination is made whether a device has disconnected from the thread network. The thread network may be a mesh network that exists among system residing within a structure. If YES, a message indicating that the devices cannot connect to each other in a room defined by the room paradigm may be announced at step 1529. If NO, process 1500 may proceed to step 1530.

At step 1530, a determination is made whether a device has disconnected from power (after having been previously connected). If YES, a message indicating that the device is disconnected from power in a room defined by the room paradigm may be announced at step 1531. If NO, process 1500 may proceed to step 1532.

At step 1532, a determination is made whether speech is not sounding in a device. If YES, a message indicating that the speaker is not working in a room defined by the room paradigm may be announced at step 1533. If NO, process 1500 may proceed to step 1534.

At step 1534, a determination is made whether a numbered problem exists. If YES, a message indicating that that particular numbered program exists in a room defined by the room paradigm may be announced at step 1533. If NO, process 1500 may end.

If, at step 1520, a warning event qualifies as a safety critical event, process 1500 may proceed to step 1536. At step 1536, a determination is made if there are two or more different warnings. If the determination is YES, process 1500 may proceed to step 1550, which is discussed in more detail below. If the determination is NO, process 1500 proceeds to step 1537.

At step 1537, a determination is made whether a device has expired. If YES, a message indicating that the device in a room defined by the room paradigm may be announced at step 1538. If NO, process 1500 may proceed to step 1539.

At step 1539, a determination is made whether a sensor has failed in a device. If YES, a message indicating that a sensor has failed in a room defined by the room paradigm may be announced at step 1540. If NO, process 1500 may proceed to step 1541.

At step 1541, a determination is made whether a buzzer has failed to sound in a device. If YES, a message indicating that the buzzer has failed in a room defined by the room paradigm may be announced at step 1542. If NO, process 1500 may proceed to step 1543.

At step 1543, a determination is made whether the battery level is very low. A battery may be considered very low if it has a projected estimated life of less than 2 weeks. If YES, a message indicating that the battery is very low in a room defined by the room paradigm may be announced at step 1544. If NO, process 1500 may end at step 1560.

At step 1550, a general heads-up message may be provided that explains attention is required in at least room defined by the room paradigm. In addition, the message may instruct the user to press a button to hear more information about the warnings. Step 1551 indicates that the system may display a first light pattern for a period of time, during which the system will wait for a user request to present more information (step 1553). If a user request for more information is received within that period of time, process 1500 may proceed to step 1554. If no request is received, process 1500 may proceed to step 1560. At step 1554, the devices may display a second light pattern while the system is speaking.

At step 1555, a compound audible message may be presented. The compound message may select up to a fixed number of warnings and present them in a streamlined manner. The warnings selected for inclusion into the compound message may be based on a priority, where more critical warnings take precedence over non-critical warnings, and certain critical warnings take precedence over other critical warnings, and certain non-critical warnings take precedence over other non-critical warnings. For example, one illustrative compound message may recite the following: "Heads-Up. Your devices cannot connect to each other [in the kitchen and in the laundry room]. The voice is not working [in the attic]. Check device.com to learn more about problem number [#]." The bracketed items may be selected based on one or more paradigms accessible to the speaking logic engine (e.g., engine 510). After the compound message is played back at step 1555, process 1500 may determine if the number of warnings is less than a fixed number at step 1556. If YES, a message may specify how many rooms require attention at step 1558. If NO, a message may specify that many rooms requires attention at step 1557. After either step 1557 and 1558, process 1500 may end at step 1560.

Figure 16:
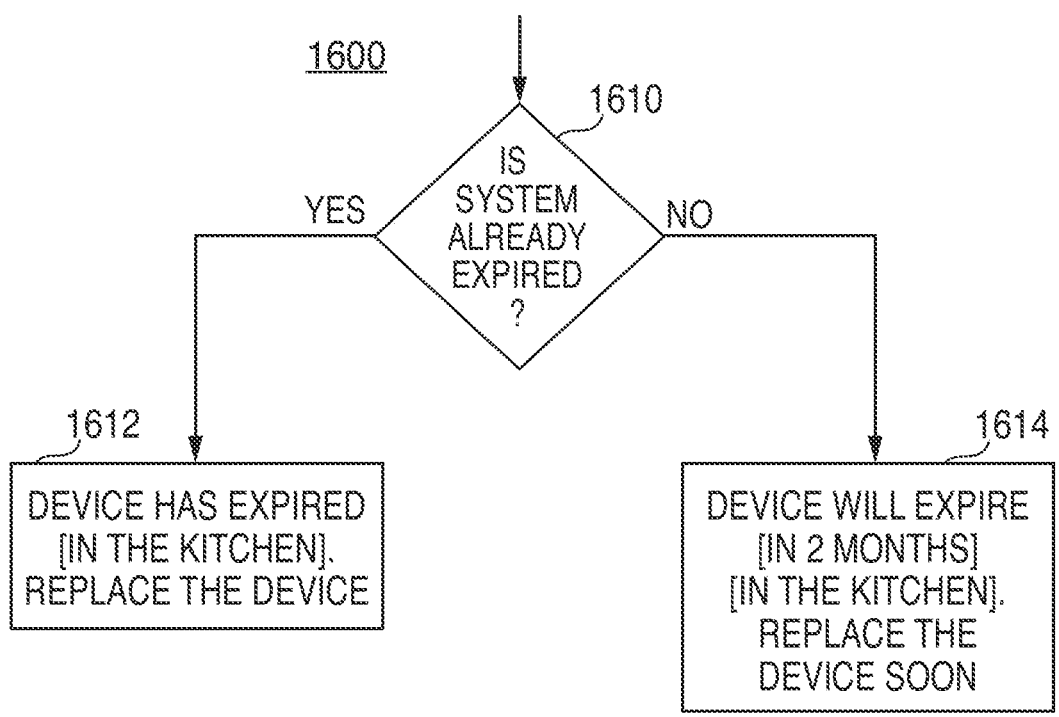
FIG. 16 shows an illustrative process for providing audible messages regarding an expiration of the system, according to an embodiment.

FIG. 16 shows illustrative process 1600 for providing audible messages regarding an expiration of the system, according to an embodiment. Starting at step 1610, process 1600 may determine whether the system has already expired. If YES, process 1600 may proceed to step 1612 where the system provides an audible message informing occupants that the device in a room defined by the room paradigm has expired. If NO, process 1600 may proceed to step 1614 where the system provides an audible message informing occupants that the device in a room defined by the room paradigm is about to expire within a time defined by the time paradigm.

Figure 17:
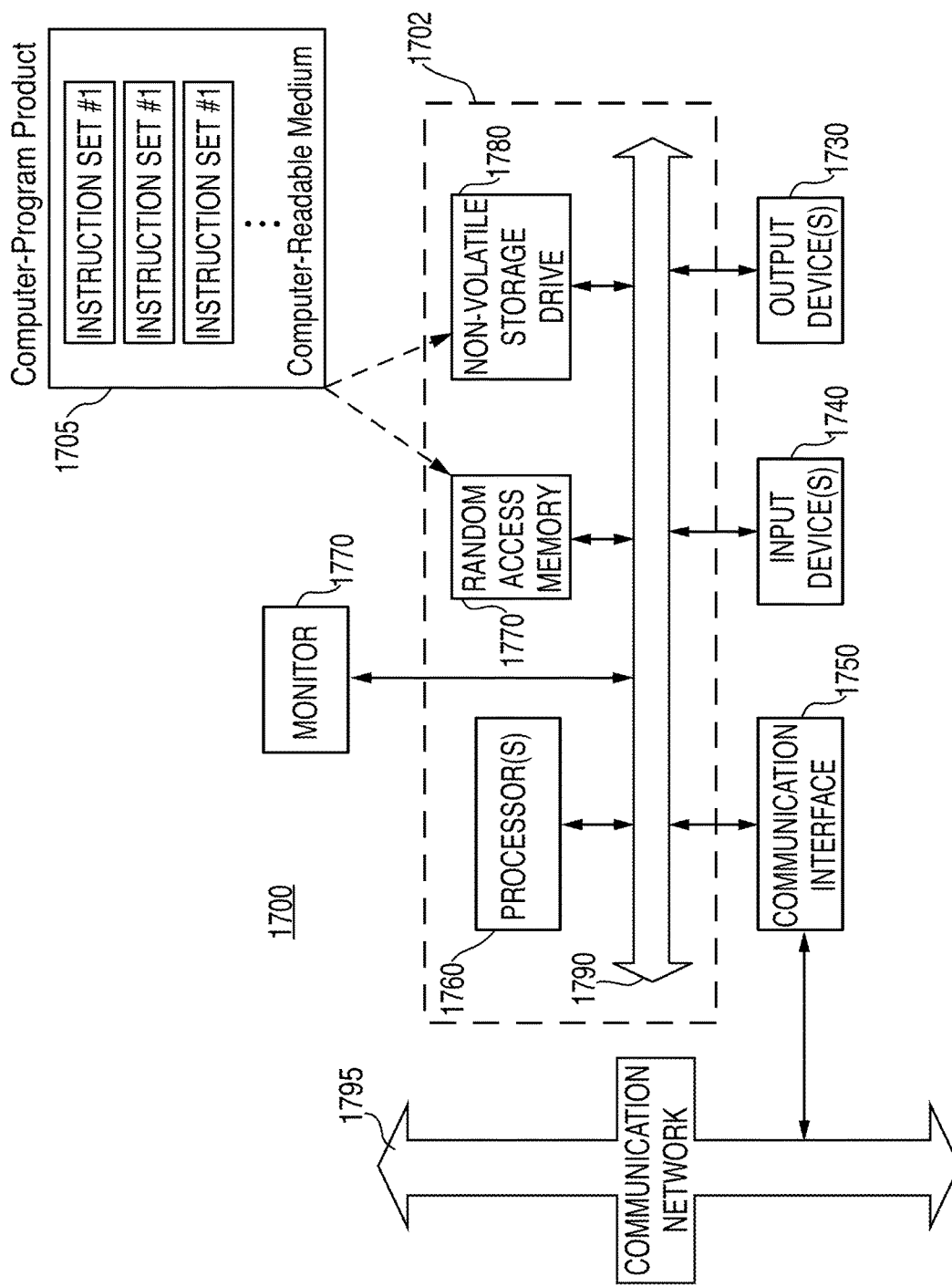
FIG. 17 shows a special-purpose computer system, according to an embodiment.

With reference to FIG. 17, an embodiment of a special-purpose computer system 1700 is shown. For example, one or more intelligent components may be a special-purpose computer system 1700. Such a special-purpose computer system 1700 may be incorporated as part of a hazard detector and/or any of the other computerized devices discussed herein, such as a remote server, smart thermostat, or network. The above methods may be implemented by computer-program products that direct a computer system to perform the actions of the above-described methods and components. Each such computer-program product may comprise sets of instructions (codes) embodied on a computer-readable medium that direct the processor of a computer system to perform corresponding actions. The instructions may be configured to run in sequential order, or in parallel (such as under different processing threads), or in a combination thereof. After loading the computer-program products on a general purpose computer system 1726, it is transformed into the special-purpose computer system 1700.

Special-purpose computer system 1700 comprises a computer 1702, a monitor 1706 coupled to computer 1702, one or more additional user output devices 1730 (optional) coupled to computer 1702, one or more user input devices 1740 (e.g., keyboard, mouse, track ball, touch screen) coupled to computer 1702, an optional communications interface 1750 coupled to computer 1702, a computer-program product 1705 stored in a tangible computer-readable memory in computer 1702. Computer-program product 1705 directs computer system 1700 to perform the above-described methods. Computer 1702 may include one or more processors 1760 that communicate with a number of peripheral devices via a bus subsystem 1790. These peripheral devices may include user output device(s) 1730, user input device(s) 1740, communications interface 1750, and a storage subsystem, such as random access memory (RAM) 1770 and non-volatile storage drive 1780 (e.g., disk drive, optical drive, solid state drive), which are forms of tangible computer-readable memory.

Computer-program product 1705 may be stored in non-volatile storage drive 1780 or another computer-readable medium accessible to computer 1702 and loaded into random access memory (RAM) 1770. Each processor 1760 may comprise a microprocessor, such as a microprocessor from Intel® or Advanced Micro Devices, Inc.®, or the like. To support computer-program product 1705, the computer 1702 runs an operating system that handles the communications of computer-program product 1705 with the above-noted components, as well as the communications between the above-noted components in support of the computer-program product 1705. Exemplary operating systems include Windows® or the like from Microsoft Corporation, Solaris® from Sun Microsystems, LINUX, UNIX, and the like.

User input devices 1740 include all possible types of devices and mechanisms to input information to computer 1702. These may include a keyboard, a keypad, a mouse, a scanner, a digital drawing pad, a touch screen incorporated into the display, audio input devices such as voice recognition systems, microphones, and other types of input devices. In various embodiments, user input devices 1740 are typically embodied as a computer mouse, a trackball, a track pad, a joystick, wireless remote, a drawing tablet, a voice command system. User input devices 1740 typically allow a user to select objects, icons, text and the like that appear on the monitor 1706 via a command such as a click of a button or the like. User output devices 1730 include all possible types of devices and mechanisms to output information from computer 1702. These may include a display (e.g., monitor 1706), printers, non-visual displays such as audio output devices, etc.

Communications interface 1750 provides an interface to other communication networks, such as communication network 1795, and devices and may serve as an interface to receive data from and transmit data to other systems, WANs and/or the Internet. Embodiments of communications interface 1750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1750 may be coupled to a computer network, to a FireWire® bus, or the like. In other embodiments, communications interface 1750 may be physically integrated on the motherboard of computer 1702, and/or may be a software program, or the like.

RAM 1770 and non-volatile storage drive 1780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1770 and non-volatile storage drive 1780 may be configured to store the basic programming and data constructs that provide the functionality of various embodiments of the present invention, as described above.

Software instruction sets that provide the functionality of the present invention may be stored in RAM 1770 and non-volatile storage drive 1780. These instruction sets or code may be executed by the processor(s) 1760. RAM 1770 and non-volatile storage drive 1780 may also provide a repository to store data and data structures used in accordance with the present invention. RAM 1770 and non-volatile storage drive 1780 may include a number of memories including a main random access memory (RAM) to store instructions and data during program execution and a read-only memory (ROM) in which fixed instructions are stored. RAM 1770 and non-volatile storage drive 1780 may include a file storage subsystem providing persistent (non-volatile) storage of program and/or data files. RAM 1770 and non-volatile storage drive 1780 may also include removable storage systems, such as removable flash memory.

Bus subsystem 1790 provides a mechanism to allow the various components and subsystems of computer 1702 to communicate with each other as intended. Although bus subsystem 1790 is shown schematically as a single bus, alternative embodiments of the bus subsystem may utilize multiple busses or communication paths within the computer 1702.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

It is to be appreciated that while the described methods and systems for intuitive status signaling at opportune times for a hazard detector are particularly advantageous in view of the particular device context, in that hazard detectors represent important life safety devices, in that hazard detectors are likely to be placed in many rooms around the house, in that hazard detectors are likely to be well-positioned for viewing from many places in these rooms, including from near light switches, and in that hazard detectors will usually not have full on-device graphical user interfaces but can be outfitted quite readily with non-graphical but simple, visually appealing on-device user interface elements (e.g., a simple pressable button with shaped on-device lighting), and in further view of power limitations for the case of battery-only hazard detectors making it desirable for status communications using minimal amounts of electrical power, the scope of the present disclosure is not so limited. Rather, the described methods and systems for intuitive status signaling at opportune times are widely applicable to any of a variety of smart-home devices such as those described in relation to FIG. 15 supra and including, but not limited to, thermostats, environmental sensors, motion sensors, occupancy sensors, baby monitors, remote controllers, key fob remote controllers, smart-home hubs, security keypads, biometric access controllers, other security devices, cameras, microphones, speakers, time-of-flight based LED position/motion sensing arrays, doorbells, intercom devices, smart light switches, smart door locks, door sensors, window sensors, generic programmable wireless control buttons, lighting equipment including night lights and mood lighting, smart appliances, entertainment devices, home service robots, garage door openers, door openers, window shade controllers, other mechanical actuation devices, solar power arrays, outdoor pathway lighting, irrigation equipment, lawn care equipment, or other smart home devices. Although widely applicable for any of such smart-home devices, one or more of the described methods and systems become increasingly advantageous when applied in the context of devices that may have more limited on-device user interface capability (e.g., without graphical user interfaces), and/or having power limitations that make it desirable for status communications using minimal amounts of electrical power, while being located in relatively readily-viewable locations and/or well-traveled locations in the home. Having read this disclosure, one having skill in the art could apply the methods and systems of the present invention in the context of one or more of the above-described smart home devices. Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Any processes described with respect to FIGS. 1-17, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:
1. A method for playing back audible messages through a speaker of at least a first hazard detection system, the first hazard detection system being one of a plurality of hazard detection systems existing within different rooms of a structure, the method comprising:

when an alarm condition exists in at least one of a plurality of the rooms of the structure, playing back voice alarms via the speaker and enabling device to device communications via an interconnected wireless fabric network according to a first state;

when a pre-alarm condition exists in at least one of a plurality of the rooms of the structure, playing back voice alarms via the speaker and enabling device to device communications via the interconnected wireless fabric network according to a second state; and receiving a hush command via a wireless communication transmitted by a mobile user device that is verified to be in the same room as an originating one of the plurality of hazard detection systems, wherein the originating one of the hazard detection systems is the hazard detection system responsible for initiating the pre-alarm condition, wherein the second state is such that it hushes all alarms being emitted by the plurality of hazard detection systems only when the originating one of the plurality of hazard detection systems processes a hush command received from the mobile user device verified to be in the same room as the originating one of the plurality of hazard detection systems, and wherein the first state is such that it does not hush all of the alarms being emitted by the plurality of hazard detection systems when any one of those plurality of hazard detection systems processes a hush command.

2. The method of claim 1, further comprising wirelessly communicating with each of the plurality of hazard detection systems existing within different rooms of the structure.

3. The method of claim 1, further comprising compiling the voice alarms based on at least one speech paradigm that uses a number of rooms experiencing a condition and a location status as factors in defining room information.

4. The method of claim 3, wherein a first one of the at least one speech paradigm comprises a plurality of conditions that specify speech paradigms to be used in the audible message.

5. The method of claim 4, wherein a first speech paradigm comprises specific room name identification.

6. The method of claim 4, wherein a second speech paradigm comprises a plurality of specific room name identifications.

7. The method of claim 4, wherein a second speech paradigm comprises a specific number of rooms.

8. The method of claim 4, wherein a third speech paradigm comprises a summarization.

9. The method of claim 1, further comprising:
activating a buzzer alarm comprising an alarming sequence characterized by buzzing periods and non-buzzing periods;
playing back at least a portion of the voice alarm during each one of the non-buzzing periods.

10. The method of claim 9, wherein the audible message spans at least two successive non-buzzing periods.

11. A hazard detection system existing within a structure comprising a plurality of hazard detection systems positioned in different rooms of the structure, the system comprising:
a speaker;
wireless circuitry for wirelessly communicating with the other hazard detection systems within the structure; and
at least one processor coupled to receive data from the other hazard detection systems via the wireless circuitry, the at least processor operative to:

when an alarm condition exists in at least one of a plurality of the rooms of the structure, play back voice alarms via the speaker and enable device to device communications via an interconnected wireless fabric network according to a first state;

when a pre-alarm condition exists in at least one of a plurality of the rooms of the structure, play back voice alarms via the speaker and enable device to device communications via an interconnected wireless fabric network according to a second state; and receive a hush command via a wireless communication transmitted by a mobile user device that is verified to be in the same room as an originating one of the plurality of hazard detection systems, wherein the originating one of the hazard detection systems is the hazard detection system responsible for initiating the pre-alarm condition, wherein the second state is such that it hushes all alarms being emitted by the plurality of hazard detection systems only when the originating one of the plurality of hazard detection systems processes a hush command received from the mobile user device verified to be in the same room as the originating one of the plurality of hazard detection systems and wherein the first state is such that it does not hush all of the alarms being emitted by the plurality of hazard detection systems when any one of those plurality of hazard detection systems processes a hush command.

12. The hazard detection system of claim 11, wherein the at least one processor is operative to:
access a speech logic engine to incorporate one of a plurality of speech paradigms to characterize spoken information that is played back as the voice alarm through the speaker.

13. The hazard detection system of claim 11, wherein the speech logic engine comprises a room paradigm that characterizes room information to be included in the audible message.

14. The hazard detection system of claim 11, wherein the speech logic engine comprises a condition paradigm that characterizes condition information to be included in the audible message.

15. The hazard detection system of claim 11, wherein the speech logic engine comprises a time paradigm that characterizes time information to be included in the audible message.

16. The hazard detection system of claim 11, wherein the speech logic engine comprises:
an audio library comprising a plurality of audio clips; and
a compiler that assembles a series of audio clips retrieved from the audio library based on at least one of the speech paradigms.

17. The hazard detection system of claim 11, wherein the at least one processor is operative to:
activate a buzzer alarm comprising an alarming sequence characterized by buzzing periods and non-buzzing periods;
play back at least a portion of the voice alarm during each one of the non-buzzing periods.

18. The hazard detection system of claim 17, wherein the audible message spans at least two successive non-buzzing periods.

* * * * *